US010231575B1

(12) United States Patent
Nicoll et al.

(10) Patent No.: US 10,231,575 B1
(45) Date of Patent: Mar. 19, 2019

(54) CABINET

(71) Applicant: NewAge Products, Inc., Vaughan (CA)

(72) Inventors: David Wesley Nicoll, Mississauga (CA); Robert Vandenham, North York (CA)

(73) Assignee: NewAge Products, Inc., Vaughan, Ontario (CA)

( * ) Notice: Subject to any disclaimer, the term of this patent is extended or adjusted under 35 U.S.C. 154(b) by 17 days.

(21) Appl. No.: 15/813,572

(22) Filed: Nov. 15, 2017

(51) Int. Cl.
*A47G 19/02* (2006.01)
*A47J 36/34* (2006.01)
*A47J 37/07* (2006.01)
*A47B 47/00* (2006.01)

(52) U.S. Cl.
CPC ........... *A47J 36/34* (2013.01); *A47J 37/0763* (2013.01); *A47B 47/00* (2013.01)

(58) Field of Classification Search
CPC ........ A47J 36/34; A47J 37/0763; A47B 47/00
USPC ......... 248/146, 152, 176.1, 176.2; 126/37 R, 126/37 B, 38; 312/236
See application file for complete search history.

(56) References Cited

U.S. PATENT DOCUMENTS

| 1,154,906 | A | * | 9/1915 | Berkley | .................... | B65D 9/32 |
| | | | | | | 217/36 |
| 5,564,665 | A | * | 10/1996 | Resnick | .................... | A47G 7/06 |
| | | | | | | 220/737 |
| D656,338 | S | | 3/2012 | Combs et al. | | |
| D657,160 | S | | 4/2012 | Combs et al. | | |
| D657,161 | S | | 4/2012 | Combs et al. | | |
| D657,162 | S | | 4/2012 | Combs et al. | | |
| D657,163 | S | | 4/2012 | Combs et al. | | |
| 8,312,807 | B2 | * | 11/2012 | Martinez | ................. | A47J 36/34 |
| | | | | | | 99/339 |
| 9,402,508 | B2 | * | 8/2016 | Cothern | .................. | A47J 36/34 |
| 9,532,680 | B2 | | 1/2017 | Roberts | | |
| 9,788,689 | B2 | * | 10/2017 | Bizal | ................... | A47J 37/0763 |
| 2010/0258106 | A1 | * | 10/2010 | Simms, II | ........... | A47J 37/0704 |
| | | | | | | 126/25 R |
| 2013/0312732 | A1 | | 11/2013 | Brennan | | |
| 2014/0021314 | A1 | | 1/2014 | Bourlier | | |
| 2014/0102925 | A1 | * | 4/2014 | Jacobson | ................. | B25H 3/00 |
| | | | | | | 206/361 |
| 2015/0114238 | A1 | * | 4/2015 | Palermo | .............. | A47J 37/0623 |
| | | | | | | 99/401 |
| 2016/0220066 | A1 | | 8/2016 | Roberts | | |
| 2017/0215641 | A1 | * | 8/2017 | DeBruler | ............ | A47J 37/0763 |
| 2017/0238762 | A1 | * | 8/2017 | Chinnah | ............ | A47J 37/0763 |

OTHER PUBLICATIONS

Design U.S. Appl. No. 29/626,148, filed Nov. 15, 2017, 22 pages.

* cited by examiner

*Primary Examiner* — Gwendolyn W Baxter
(74) *Attorney, Agent, or Firm* — Howard & Howard Attorneys PLLC

(57) ABSTRACT

A cabinet for supporting one of a plurality of cooking devices having varying sizes includes a frame defining a center axis and having a top surface including an edge defining an opening. The opening has an initial configuration. The cabinet further has at least one adjustment element directly attached to the top surface of the frame to extend a distance toward the center axis to form an adjusted configuration of the opening for receiving one of the cooking devices.

20 Claims, 20 Drawing Sheets

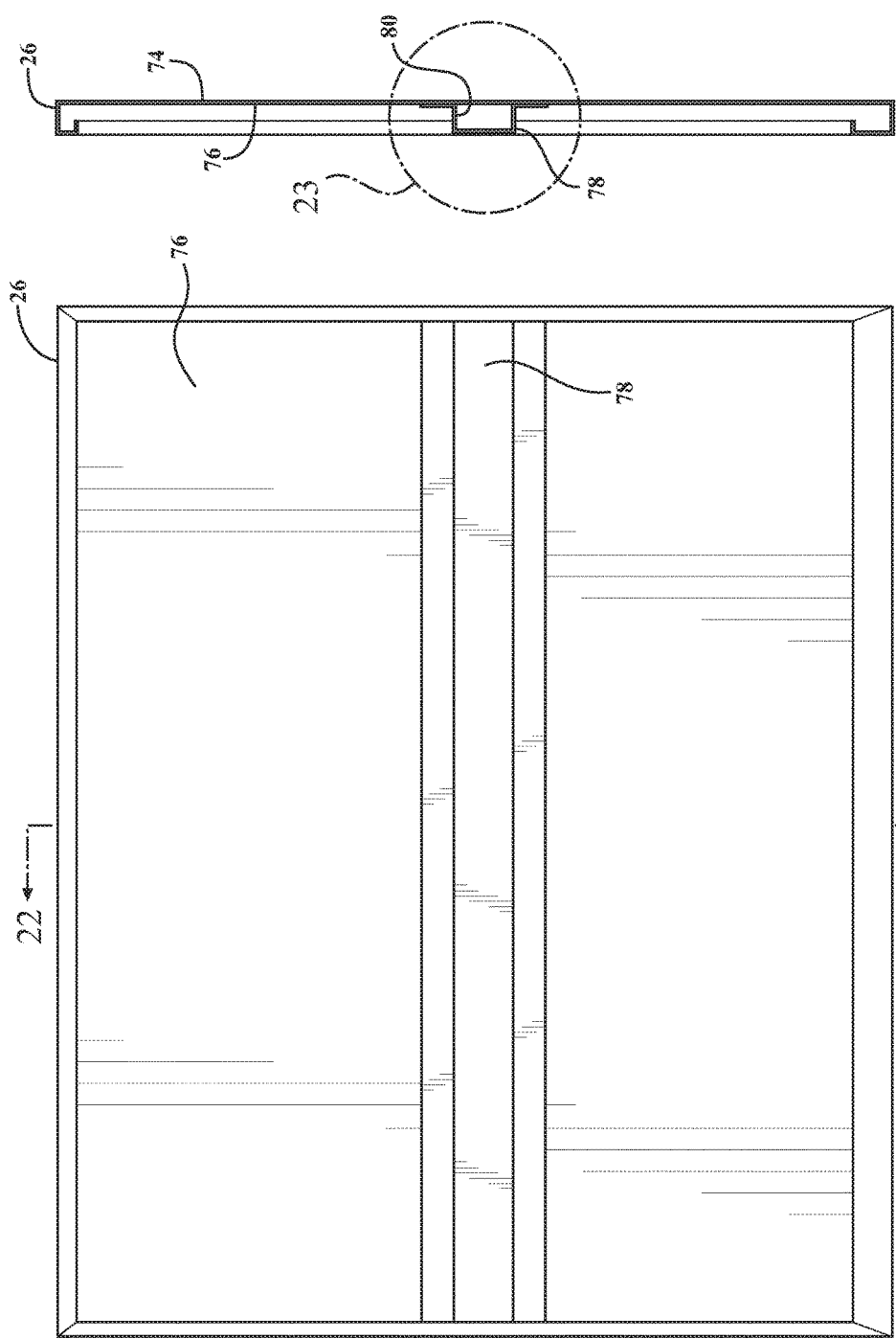

CABINET

FIELD OF THE DISCLOSURE

The present disclosure relates generally to a cabinet.

BACKGROUND

Cabinets are used for supporting articles of various types and configurations. Some cabinets are specifically configured to support a particular type of article. For example, a cabinet may be configured to support a ceramic cooking device, such as a kamado-style cooking device. Such kamado-style cooking devices are typically available in varying sizes, and use of a single cabinet to support all of the different sizes of the cooking device has become a challenge. The present disclosure is aimed at solving the challenge identified above.

SUMMARY

A cabinet for supporting one of a plurality of cooking devices having varying sizes is disclosed. The cabinet includes a frame defining a center axis with the frame having a top surface having an edge defining an opening with the opening having an initial configuration, and at least one adjustment element directly attached to the top surface of the frame to extend a distance toward the center axis to form an adjusted configuration of the opening for receiving one of the cooking devices.

BRIEF DESCRIPTION OF THE DRAWINGS

Advantages of the present disclosure will be readily appreciated as the same becomes better understood by reference to the following detailed description when considered in connection with the accompanying drawings. It is to be appreciated that the drawings are merely illustrative and are not necessarily drawn to scale.

FIG. 21 is a bottom view of the shelf of FIG. 19.

FIG. 22 is a cross-sectional view of the shelf taken along lines 22-22 of FIG. 21.

DETAILED DESCRIPTION

Referring now to the figures, wherein like numerals indicate corresponding parts throughout the several views, embodiments of a cabinet 10, 100 for supporting one of a plurality of cooking devices 12 having varying sizes are shown throughout the figures and are described in detail below. The cabinet 10, 100 may be used individually or as part of a system or assembly of cabinets. In one embodiment, the cabinet 10, 100 may be one of a plurality of cabinets for a kitchen. The kitchen may include a system or assembly of cabinets fixed to one another in a particular arrangement. Alternatively, the kitchen may be modular, where the cabinets are moveable and/or interchangeable. In an embodiment, the cabinet 10, 100 is configured for use outside of a commercial or residential structure, and may be referred to as an outdoor cabinet or a cabinet that is part of an outdoor kitchen.

The cabinet 10, 100 is configured to support one of a plurality of cooking devices 12 having varying sizes. In the embodiments shown, the cabinet 10, 100 is configured to support a ceramic cooking device, such as a Japanese wood or charcoal-fueled cook stove often referred to as a kamado-style grill, cooker, or cooking device 12 as shown in the figures. The kamado-style cooking device 12 is typically available in various sizes, such as small, medium, and large sizes. The small-sized kamado cooking device has a cross-sectional effective diameter that is smaller than that of the medium-sized kamado cooking device. The medium-sized kamado cooking device has a cross-sectional effective diameter that is smaller than that of the large-sized kamado cooking device. Alternatively, the cabinet 10, 100 could be configured to support any type of ceramic cooking device, cauldron-style cooking device, egg-shaped cooking device, or the like that is available in varying sizes. In addition, the cabinet 10, 100 could also be configured to support any other type of cooking device available in varying sizes. Although the cabinet 10, 100 is configured to support a cooking device available in varying sizes, it is to be appreciated that the cabinet 10, 100 can also support a cooking device or other article available in just a single size.

Figure 1:
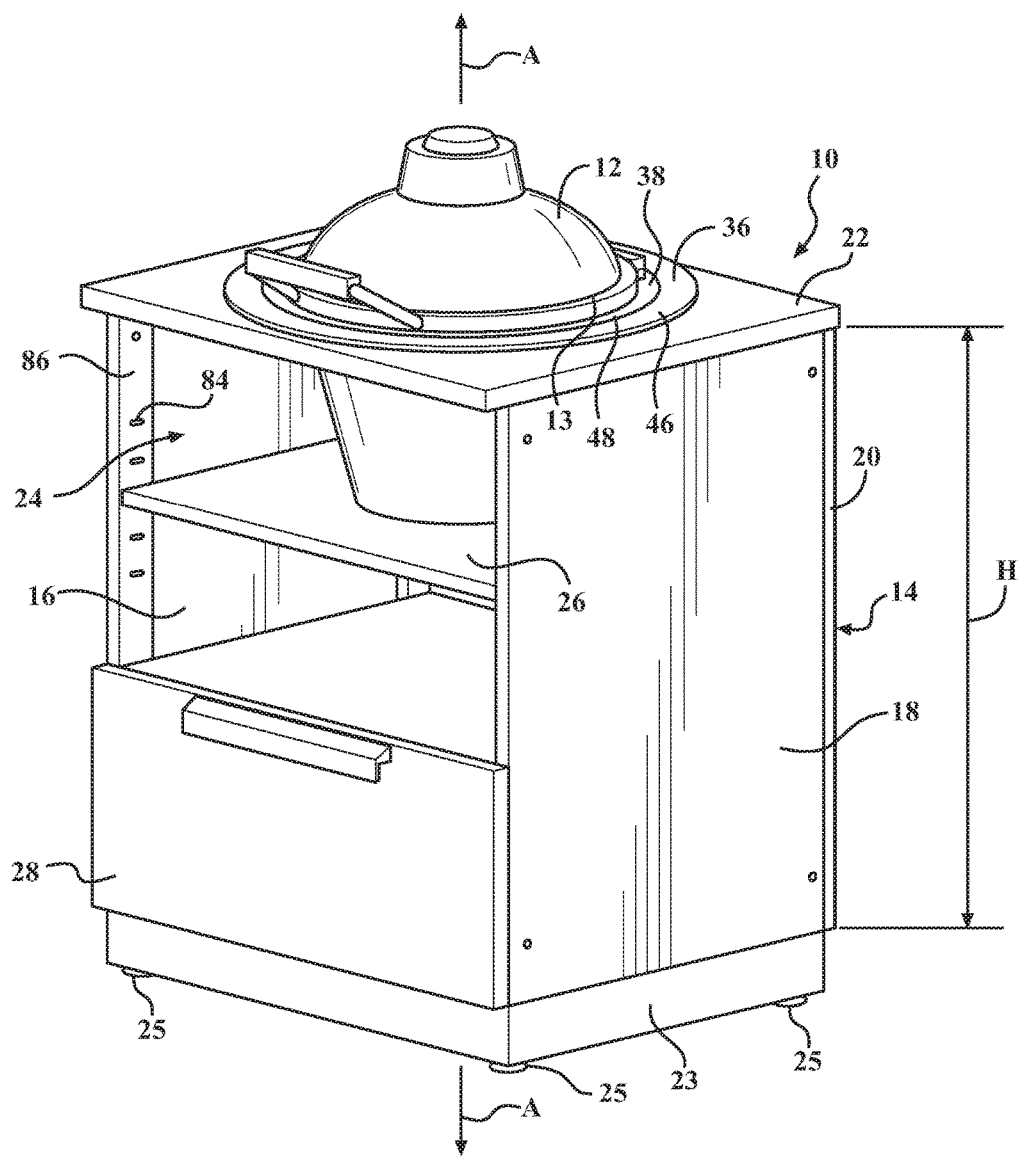
FIG. 1 is a perspective view of an assembly including a cabinet and a cooking device having a first size supported by the cabinet, according to a first embodiment of the present disclosure.
Figure 2:
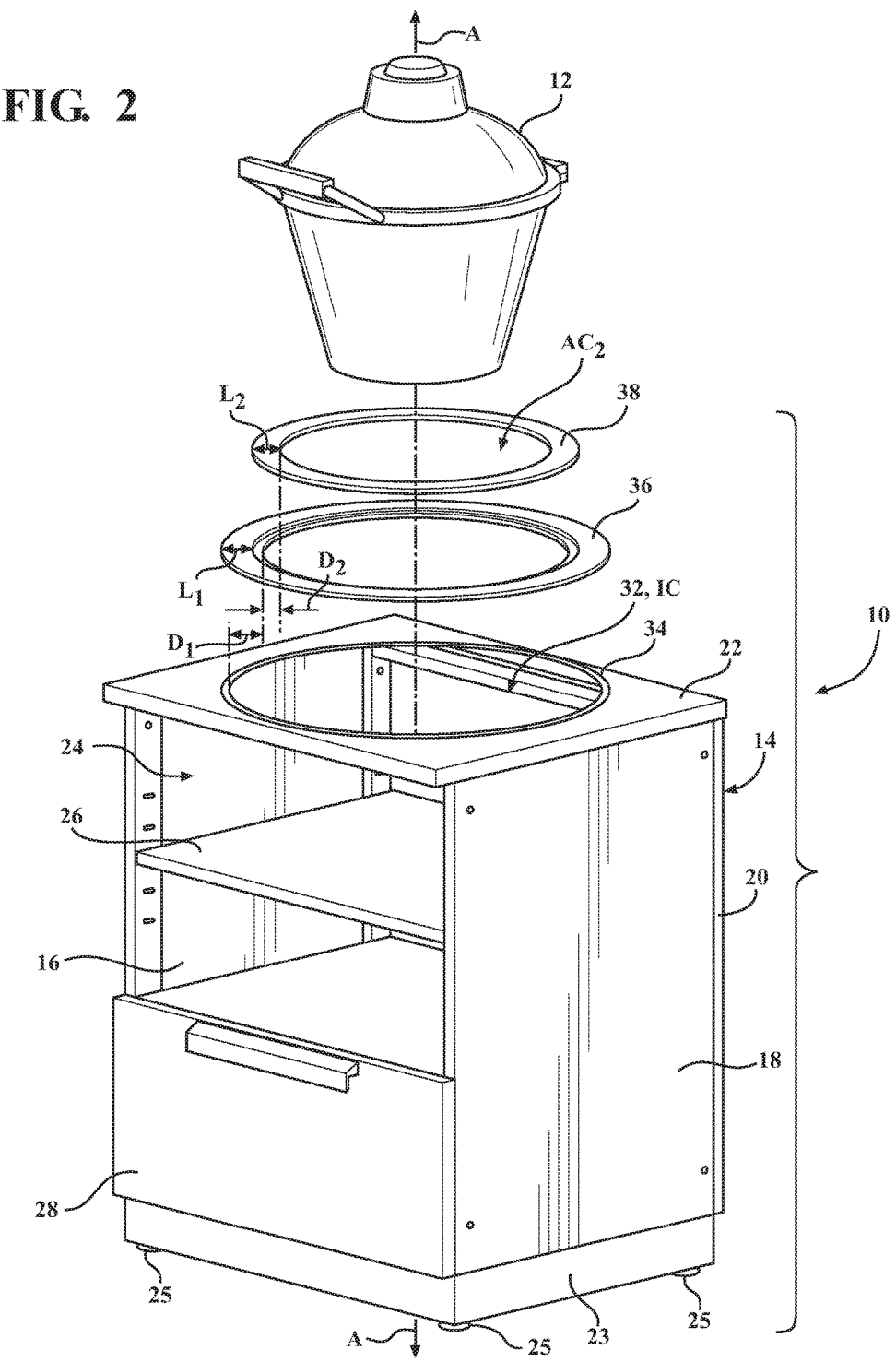
FIG. 2 is an exploded view of the assembly of FIG. 1.
Figure 3:
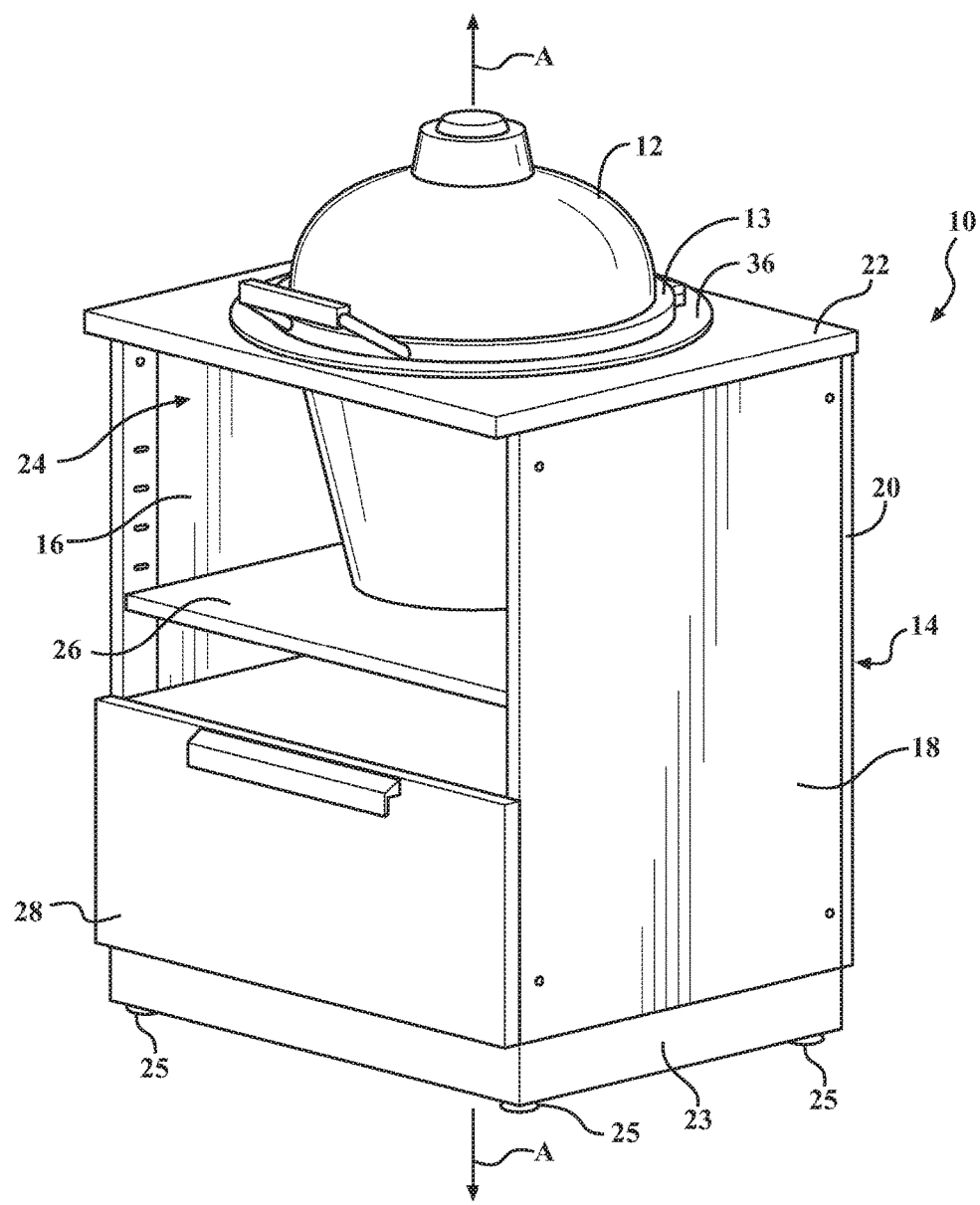
FIG. 3 is a perspective view of an assembly including the first embodiment of the cabinet and the cooking device having a second size supported by the cabinet.
Figure 4:
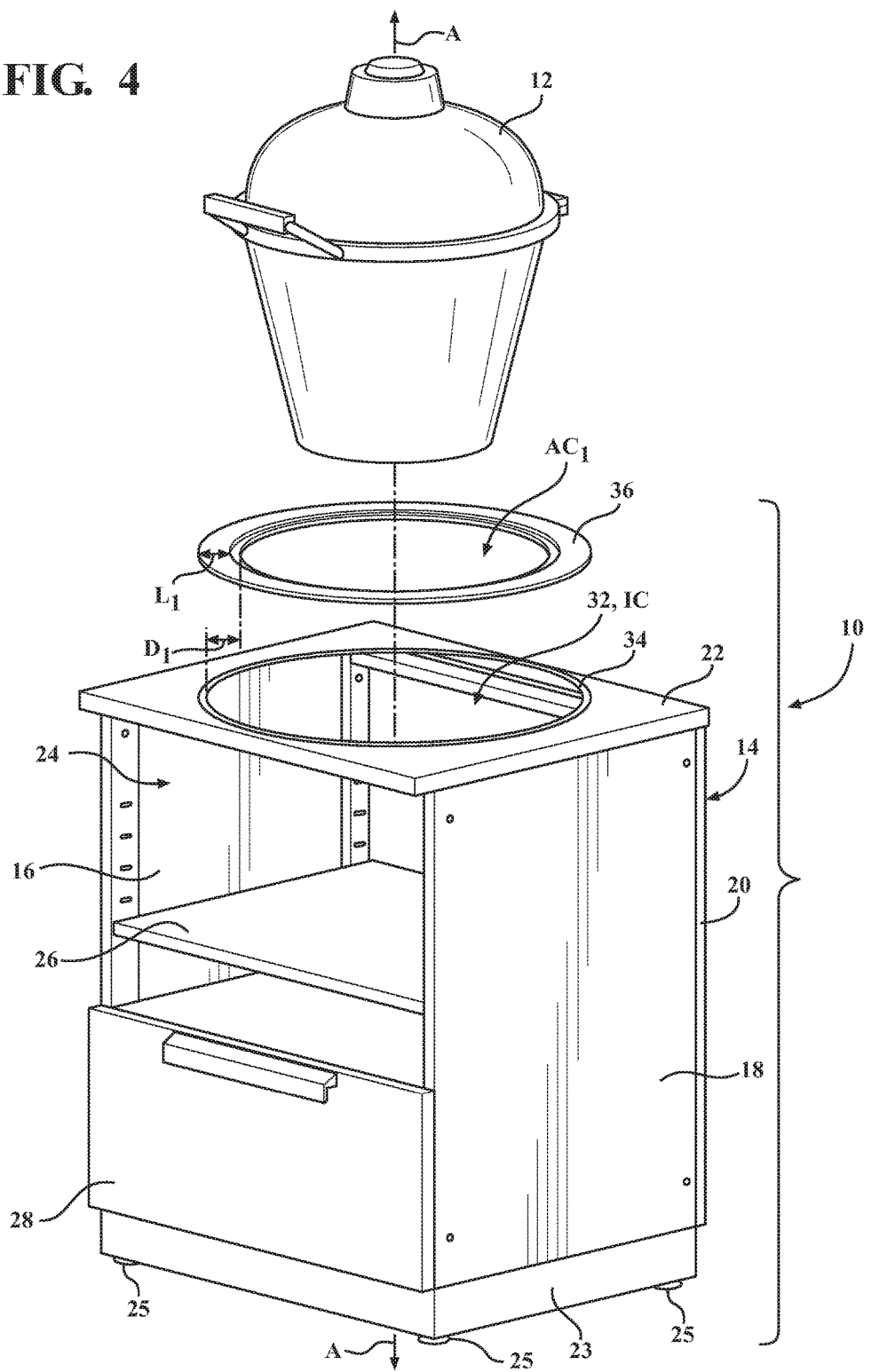
FIG. 4 is an exploded view of the assembly of FIG. 3.
Figure 5:
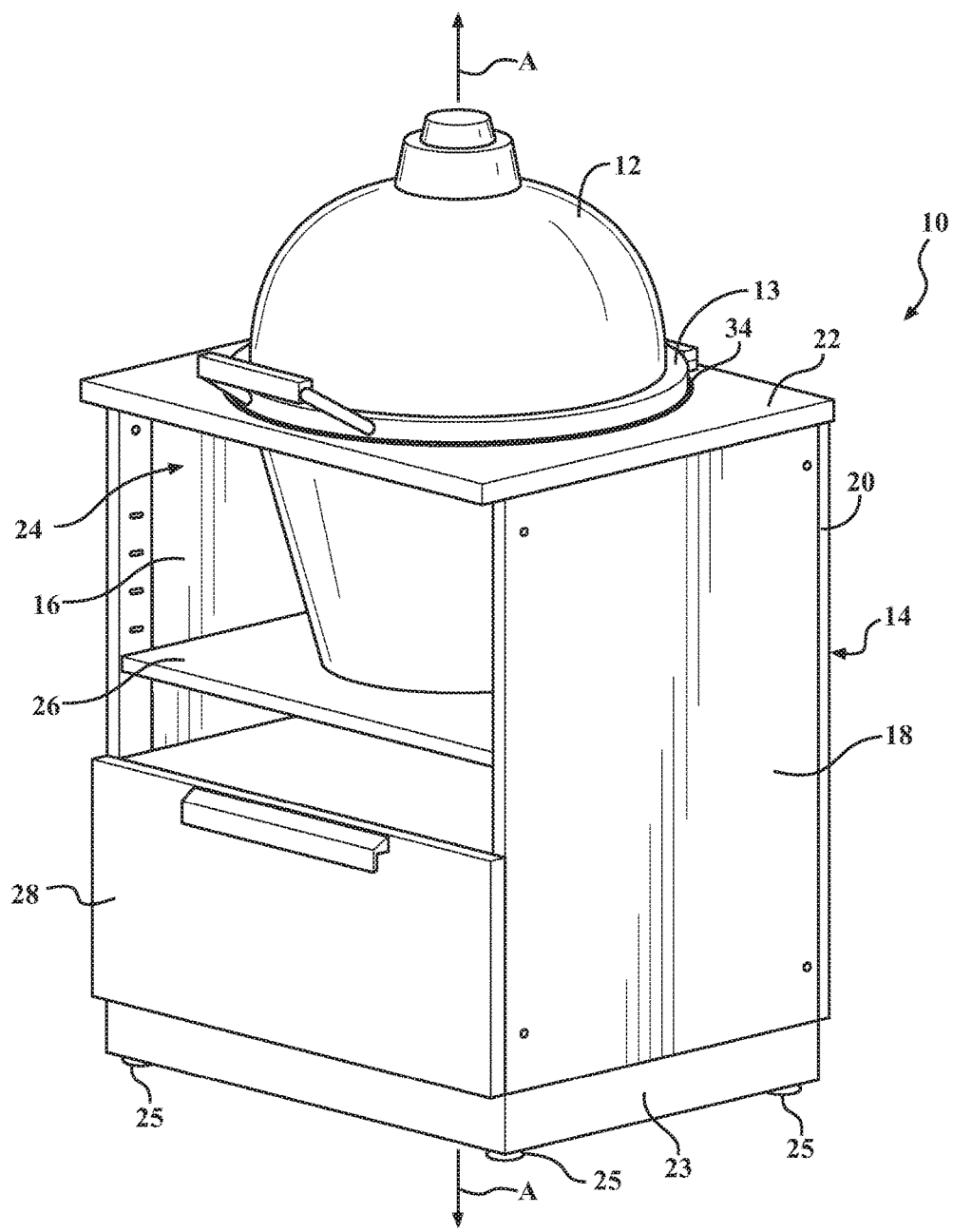
FIG. 5 is a perspective view of an assembly including the first embodiment of the cabinet and the cooking device having a third size supported by the cabinet.
Figure 6:
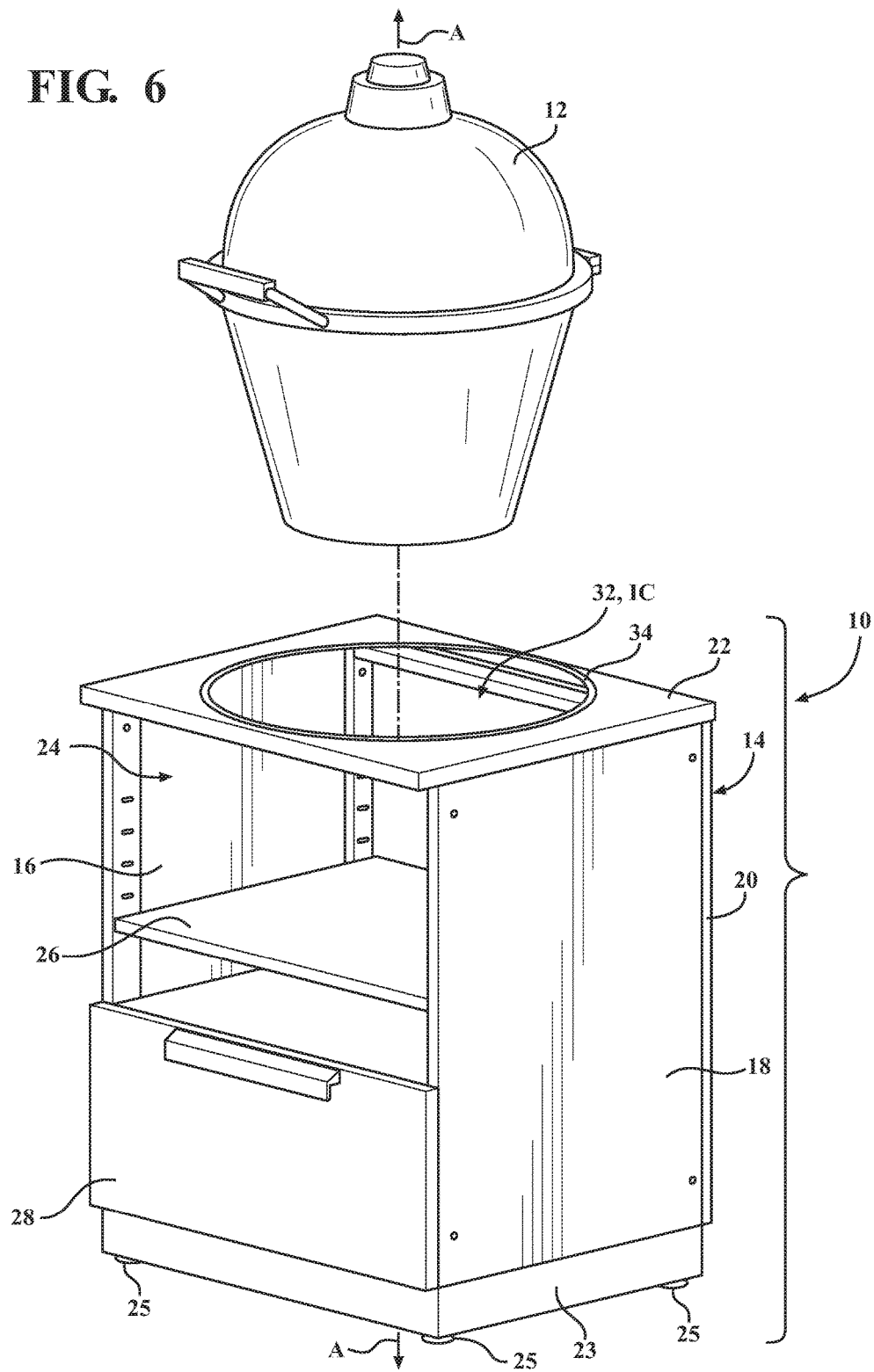
FIG. 6 is an exploded view of the assembly of FIG. 5.

In a first embodiment of the present disclosure, FIGS. 1 and 2 show the cabinet 10 supporting a kamado-style cooking device 12 having a small size, FIGS. 3 and 4 show the cabinet 10 supporting the kamado cooking device 12 having a medium size, and FIGS. 5 and 6 show the cabinet 10 supporting the kamado cooking device 12 having a large size. The cabinet 10 is configured to support one of a plurality of cooking devices 12 having varying sizes when the cooking device 12 is or is not being used for preparing food.

Details of the first embodiment of the cabinet 10 are described below at least with reference to FIGS. 1-10. The cabinet 10 includes a frame 14. As best shown in FIGS. 1-6, the frame 14 has first 16 and second 18 side panels, a rear panel 20 extending between the first 16 and second 18 side panels, a top surface 22, and a base 23. Each of the first 16 and second 18 side panels and the rear panel 20 of the cabinet 10 has a height, and the respective heights of the panels 16, 18, 20 are substantially the same. The panels 16, 18, 20 may be formed from any suitable material such as, but not limited to, a metal, a metal alloy (such as stainless steel), aluminum, a wood, a composite material, and/or combinations thereof.

The top surface 22 may also be referred to as a countertop, and the top surface 22 is attached or mounted to the respective ends of the first side panel 16, the second side panel 18, and the rear panel 20. The top surface 22 may be formed from any suitable material such as, but not limited to, a metal, a metal alloy (such as stainless steel), aluminum or an alloy thereof, a stone, a wood, a composite material, and/or combinations thereof. In an embodiment, the top surface 22 is formed from the same material as the panels 16, 18, 20.

The base 23 is attached or mounted to respective ends of the first side panel 16, the second side panel 18, and the rear panel 20 opposite the ends that are attached or mounted to the top surface 22. In the embodiment shown, the cabinet 10 further has a plurality of feet 25 attached to the base 23. The feet 25 may be independently or collectively adjustable to increase or decrease the height of the frame 14.

The frame 14 defines a center axis A. The frame 14 also has a height H (shown in FIG. 1), which is defined by the respective heights of the panels 16, 18, 20. In other words, the height H of the frame 14 is the same as the height of the first side panel 16, is the same as the height of the second side panel 18, and is the same as the height of the rear panel 20. The frame 14 further defines a compartment 24 for receiving a shelf 26. The shelf 26 is disposed in the compartment 24 of the frame 14 for supporting one of the plurality of cooking devices 12. A position of the shelf 26 is adjustable relative to the height H of the frame 14. Further details of the shelf 26 and the adjustability of the shelf 26 relative to height H of the frame 14 are described below.

The cabinet 14 further has at least one drawer 28 disposed in the compartment 24 of the frame 14. The drawer 28 may have any desirable configuration. In an embodiment, the drawer 28 is configured to store wood, charcoal, or other suitable material for fueling the cooking device 12. In an alternative embodiment, the cabinet 10 could have or define a cupboard (enclosed by at least one door) or the like in addition to or instead of the drawer 28 for storing the wood, charcoal, or other suitable material for fueling the cooking device 12. Additional drawers and/or cupboards for other purposes may also be included.

The top surface 22 of the frame 14 defines a plane P. The top surface 22 further has an edge 30 defining an opening 32. The opening 32 has an initial configuration IC as shown in FIG. 6, where the cabinet 10 is configured to support the kamado-style cooking device 12 having the large size. The initial configuration IC of the opening 32 is shown as being circular. In alternative embodiments, the initial configuration IC of the opening 32 could be any suitable configuration, such as an elliptical configuration, a polygonal configuration (such as a triangular configuration, a square configuration, a rectangular configuration, a trapezoidal configuration, and pentagonal configuration, etc.), or a configuration similar to the cross-sectional configuration of the large-sized cooking device 12.

Figure 7:
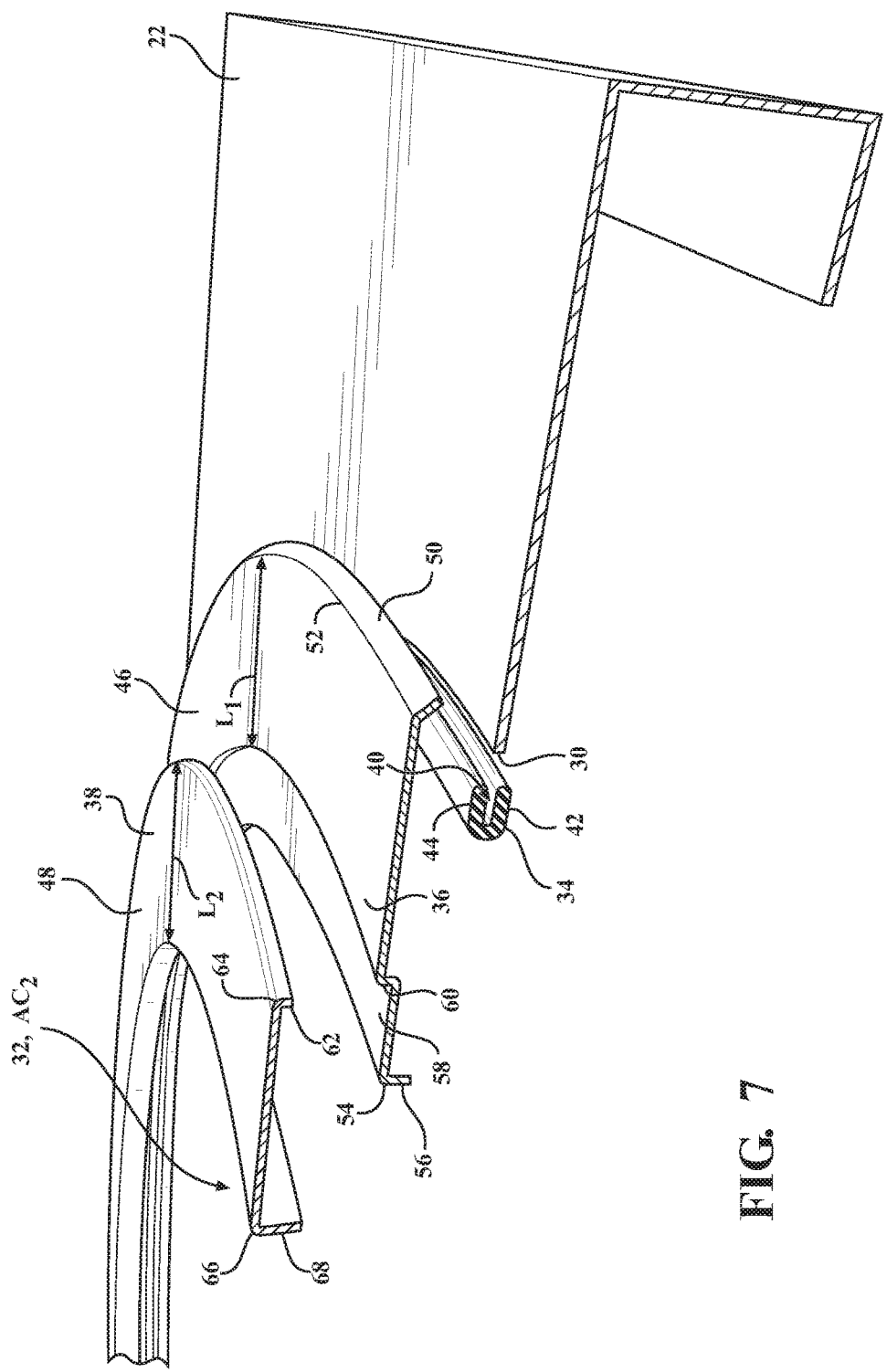
FIG. 7 is a cross-sectional, exploded view of a portion of the cabinet depicted in FIG. 1.
Figure 9:
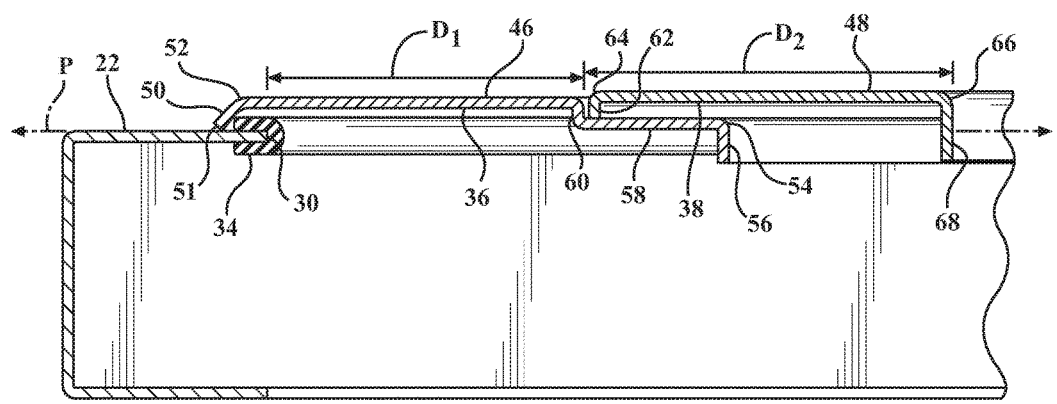
FIG. 9 is a cross-sectional view of a portion of the cabinet taken along line 9-9 in FIG. 8.

The cabinet 10 further has an orientation device 34 attached to and extending at least partially along the edge 30 of the top surface 22. In the embodiment shown, the orientation device 34 extends along the entire edge 30 of the top surface 22. The orientation device 34 may be any device that will suitably orient the cooking device 12 and/or adjustment elements 36, 38 of the cabinet 10. As best shown in FIGS. 7 and 9, the orientation device 34 has a U-shaped configuration with a center portion 40 of the 'U' configured to receive the edge 30 of the top surface 22 of the frame 14. The orientation device 34 may have any suitable width. In addition, legs 42, 44 of the U-shaped orientation device 34 may have any suitable length. In an embodiment, the orientation device 34 is formed from any suitable material such as, but not limited to, a plastic material, an elastomeric material, a composite material, and/or combinations thereof.

In the embodiment shown, the cabinet 10 has a single orientation device 34. In an alternative embodiment, the cabinet 10 could include a plurality of orientation devices 34 with each orientation device 34 attached to and extending from the edge 30 of the top surface 22 of the frame 14. In this alternative embodiment, the orientation devices 34 could be spaced from one another along the edge 30 of the top surface 22.

The cabinet 10 is configured to support the large-sized cooking device 12 as follows. With reference to FIGS. 5 and 6, the large-sized cooking device 12 is partially placed through the opening 32 having the initial configuration IC. A bottom side of the cooking device 12 rests against the shelf 26 disposed in the compartment 24 of the frame 14. The shelf 26 is adjusted relative to the larger configuration of the opening 32 for receiving the large-sized cooking device 12. The shelf 26 is also adjusted relative to the height H of the frame 14 to accommodate the large-sized cooking device 12. In some instances, the cooking device 12 may have a lip 13, and the height of the shelf 26 may be adjusted such that the lip 13 of the cooking device 12 rests against the orientation device 34 attached to the edge 30 of the top surface 22 of the cabinet 10 when the cooking device 12 is partially placed through the opening 32 and rests against the shelf 26.

To properly support the cooking device 12 having the medium and small sizes, the configuration of the opening 32 defined by the edge 30 of the top surface 22 of the cabinet 10 is adjusted utilizing at least one adjustment element 36. As shown in FIGS. 3 and 4, the at least one adjustment element 36 is directly attached to the top surface 22 of the frame 14 to extend a distance $D_1$ toward the center axis A to form an adjusted configuration $AC_1$ of the opening 32 for receiving one of the (e.g., medium-sized) cooking devices 12. Accordingly, for the first embodiment described herein, the cabinet 10 including the adjustment element 36 alone is configured to support the cooking device 12 having the medium size. The adjusted configuration $AC_1$ of the opening 32 is smaller than the initial configuration IC of the opening 32. In addition, the adjusted configuration of the opening 32 may be shaped similarly or differently than the initial configuration IC of the opening 32. As shown in FIG. 4, the adjusted configuration $AC_1$ is substantially circular, and is similar to the initial configuration IC of the opening 32. In alternative embodiments, the adjusted configuration $AC_1$ could be any suitable configuration, such as an elliptical configuration, a polygonal configuration (such as a triangular configuration, a square configuration, a rectangular configuration, a trapezoidal configuration, and pentagonal configuration, etc.), or another configuration that is similar to the cross-sectional shape of the medium-sized cooking device 12.

As previously mentioned, the cabinet 10 including the adjustment element 36 alone is configured to support the medium-sized cooking device 12. In an embodiment, the adjustment element 36 is further defined as first 36 and second 38 adjustment elements. As shown in FIGS. 1 and 2, the first adjustment element 36 is directly attached to the top surface 22 of the frame 14 to extend a first distance $D_1$ toward the center axis A, and the second adjustment element 38 is attached to the first adjustment element 36 to extend a second distance $D_2$ toward the center axis A to form a second adjusted configuration $AC_2$ of the opening 32. Accordingly, for the first embodiment described herein, the cabinet 10 including the first adjustment element 36 and the second adjustment element 38 is configured to support the cooking device 12 having the small size. Details of the first 36 and second 38 adjustment elements are described below with reference to FIGS. 1, 2, and 7-9 for the cabinet 10 supporting the small-sized cooking device 12. Use of the first adjustment element 36 alone to configure the cabinet 10 to support the medium-sized cooking device 12 and use of the first 36 and second 38 adjustment elements together to configure the cabinet 10 to support the small-sized cooking device 12 will follow.

Referring to FIGS. 1, 2, and 7-9, the cabinet 10 includes the first 36 and second 38 adjustment elements and is configured to support the kamado-style cooking device 12 having the small size. As previously mentioned, the first adjusted configuration $AC_1$ is smaller than the initial configuration IC of the opening 32, and the first adjusted configuration $AC_1$ may be shaped similarly or differently than the initial configuration IC. The second adjusted configuration $AC_2$ is different than the first adjusted configuration $AC_1$ for receiving the small-sized cooking device 12. As shown, the second adjusted configuration $AC_2$ is circular, similar to the first adjusted configuration $AC_1$ of the opening 32. However, the second adjusted configuration $AC_2$ is smaller than the first adjusted configuration $AC_1$. In alternative embodiments, the second adjusted configuration $AC_2$ could be any suitable configuration, such as an elliptical configuration, a polygonal configuration (such as a triangular configuration, a square configuration, a rectangular configuration, a trapezoidal configuration, and pentagonal configuration, etc.), or another configuration that is similar to the cross-sectional shape of the small-sized cooking device 12.

Figure 8:
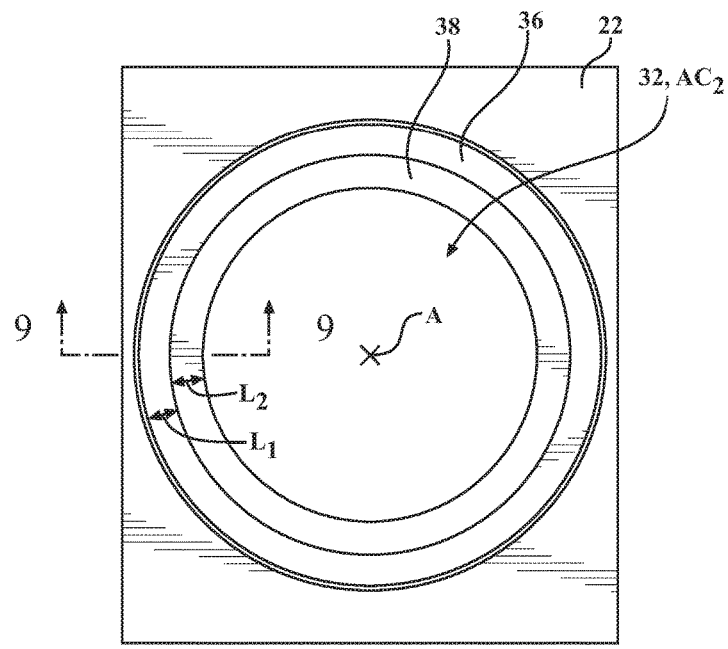
FIG. 8 is a top view of the cabinet depicted in FIG. 1.

Details of the first 36 and second 38 adjustment elements are described in detail below at least with reference to FIGS. 7-9. The first adjustment element 36 of the cabinet 10 partially overlaps the top surface 22 of the frame 14. In an embodiment, a portion of the first adjustment element 36 overlaps the orientation device 34 for maintaining a particular position of the first adjustment element 36 relative to the edge 30 of the top surface 22 of the frame 14.

The first adjustment element 36 has an adjustment surface 46. In the embodiment shown, the adjustment surface 46 of the first adjustment element 36 is disposed on one side of the plane P of the top surface 22 of the frame 14. In addition, the adjustment surface 46 of the first adjustment element 36 is parallel to the top surface 22 of the frame 14.

The first adjustment element 36 further has a lip 50 extending from the adjustment surface 46. The lip 50 engages the orientation device 34 to secure the first adjustment element 36 to the top surface 22 of the frame. The lip 50 may have any suitable length and, in the embodiment shown, extends from the adjustment surface 46 at an angle such that the lip 50 extends in a downward direction. The lip 50 may be integral with the adjustment surface 46, or may be attached to the adjustment surface 46 by any suitable means such as by welding or the like. In addition, the lip 50 extends along the entire circumference of the first adjustment element 36. In an alternative embodiment, the lip 50 could extend along a portion of the circumference of the first adjustment element 36.

The first adjustment element 36 has first 52 and second 54 ends with the first end 52 attached to the top surface 22 of the frame 14. In an embodiment, the lip 50 extends from the first end 52 of the first adjustment element 36. The adjustment surface 46 of the first adjustment element 36 has a length $L_1$, which extends between the first end 52 of the adjustment element 36 and a stop 60, which is described in further detail below. The adjustment element 36 further has a flange 56 extending from the second end 54. As shown, the flange 56 may be integral with or attached to the second end 54, such as by welding or the like, and the flange 56 extends inwardly toward the compartment 24 defined by the frame 14.

The first adjustment element 36 has a stepped surface 58 parallel to and offset from the adjustment surface 46. The stepped surface 58 is configured to receive and support at least a portion of the second adjustment element 38 as described further below. As shown, the stepped surface 58 is parallel to the adjustment surface 46 of the first adjustment element 36. In addition, an intersection of the adjustment surface 46 and the stepped surface 58 of the first adjustment element 36 defines the stop 60 for engagement by the second adjustment element 38 to secure the second adjustment element 48 to the first adjustment element 46.

As previously mentioned, the second adjustment element 38 is attached to the first adjustment element 36. When the second adjustment element 38 is set or placed into position, a portion of the second adjustment element 38 engages the stepped surface 58 of the first adjustment element 36 and extends the second distance $D_2$ toward the center axis A to form the second adjusted configuration $AC_2$ of the opening 32. The second adjusted configuration $AC_2$ of the opening 32 is smaller than the first adjusted configuration for receiving the cooking device 12 having the small size.

The second adjustment element 38 has an adjustment surface 48. As best shown in FIG. 9, the adjustment surface 48 of the second adjustment element 38 is disposed on one side of the plane P of the frame 14, which is the same side of the plane P that the adjustment surface 46 of the first adjustment element 36 is disposed. In other words, each of the adjustment surface 46 of the first adjustment element 36 and the adjustment surface 48 of the second adjustment element 38 is disposed on one side of the plane P. In addition, the adjustment surface 48 of the second adjustment element 38 is parallel to the top surface 22 of the frame 14. The adjustment surface 48 of the second adjustment element 38 is also parallel to the adjustment surface 46 of the first adjustment element 46.

The second adjustment element 38 further has a lip 62 extending from the adjustment surface 48 of the second adjustment element 38. The lip 62 of the second adjustment element 38 engages the stop 60 of the first adjustment element 36 to secure the second adjustment element 38 to the first adjustment element 36. The lip 62 extends from the adjustment surface 48 downwardly at an angle of about 90 degrees. In addition, the lip 62 has a length that is about the same as the length of the stop 60. The lip 62 may be integral with the adjustment surface 48, or may be attached to the adjustment surface 48 by any suitable means such as by welding or the like. In addition, the lip 62 extends along the entire circumference of the second adjustment element 38. In an alternative embodiment, the lip 62 could extend along a portion of the circumference of the second adjustment element 38.

The second adjustment element 38 further has first 64 and second 66 ends with the lip 62 of the second adjustment element 38 extending from the first end 64 of the second adjustment element 38. The second adjustment element 38 has a length extending between the first 64 and second 66 ends, which is the same as the length $L_2$ of the adjustment surface 48 of the second adjustment element 38. In addition, the adjustment surface 48 of the second adjustment element 38 has substantially the same length as the adjustment surface 46 of the first adjustment element 36. In other words, the length $L_2$ is substantially the same as the length $L_1$.

The second adjustment element 38 further has a flange 68 that extends from the second end 66 of the second adjustment element 38 to define the second adjusted configuration $AC_2$. As shown, the flange 68 extends downwardly and/or inwardly toward the compartment 24 defined by the frame 14. In addition, the flange 68 may be integral with or attached to the second end 66 of the second adjustment element 38, such as by welding or the like.

Each of the first and second adjustment elements 36, 38 has an annular configuration. Alternatively, each of the first and second adjustment elements 36, 38 could have any suitable configuration. In addition, the first and second adjustment elements 36, 38 can have substantially the same configuration, or the first adjustment element 36 could have a configuration that differs from that of the second adjustment element 38.

The first embodiment of the cabinet 10 is configured to support the medium-sized cooking device 12 as follows. With reference to FIGS. 3 and 4, an operator places the first adjustment element 36 over the opening 32 such that a portion of the adjustment surface 46 overlaps the top surface 22. The first adjustment element 36 also overlaps the orientation device 34 such that the lip 50 engages the orientation device 34 to secure the first adjustment element 36 to the top surface 22 of the frame 14.

When the first adjustment surface 36 is set into position, the medium-sized cooking device 12 is partially placed through the opening 32 having the first adjusted configuration $AC_1$. The first adjusted configuration $AC_1$ is smaller than the initial configuration IC of the opening 32 to properly accommodate and/or fit the cross-sectional configuration of the medium-sized cooking device 12. In addition, the bottom side of the cooking device 12 rests against the shelf 26 disposed in the compartment 24 of the frame 14. The shelf 26 may be adjusted relative to the configuration of the opening 32. The shelf 26 may also be adjusted relative to the height H of the frame 14 to accommodate the medium-sized cooking device 12. In some instances, the cooking device 12 has the lip 13, and the height of the shelf 26 may be adjusted to that the lip 13 rests against the stepped surface 58 of the first adjustment element 36.

The first embodiment of the cabinet 10 is configured to support the small-sized cooking device 12 as follows. With reference to FIGS. 1 and 2, an operator places the first adjustment element 36 over the opening 32 such that a portion of the adjustment surface 46 overlaps the top surface 22. The first adjustment element 36 also overlaps the orientation device 34 such that the lip 50 engages the orientation device 34 to secure the first adjustment element 36 to the top surface 22 of the frame 14. When the first adjustment surface 36 is set into position, the operator places the second adjustment element 38 over a portion of the first adjustment element 36 such that at least a portion of the second adjustment element 38 rests against the stepped portion 58 of the first adjustment element 36. Further, the lip 62 of the second adjustment element 38 engages the stop 60 of the first adjustment element 36 to secure the second adjustment element 38 to the first adjustment element 36.

Once the second adjustment element 38 is properly positioned, the small-sized cooking device 12 is partially placed through the opening 32 having the second adjusted configuration $AC_2$. The second adjusted configuration $AC_2$ is smaller than the first adjusted configuration $AC_1$ to properly accommodate and/or fit the cross-sectional configuration of the small-sized cooking device 12. In addition, the bottom side of the cooking device 12 rests against the shelf 26 disposed in the compartment 24 of the frame 14. The shelf 26 may be adjusted based on the configuration of the opening 12, and relative to the height H of the frame 14 to accommodate the small-sized cooking device 12. In some instances, the cooking device 12 has the lip 13, and the height of the shelf 26 may be adjusted to that the lip 13 rests against the adjustment surface 48 of the second adjustment element 38.

Figure 10:
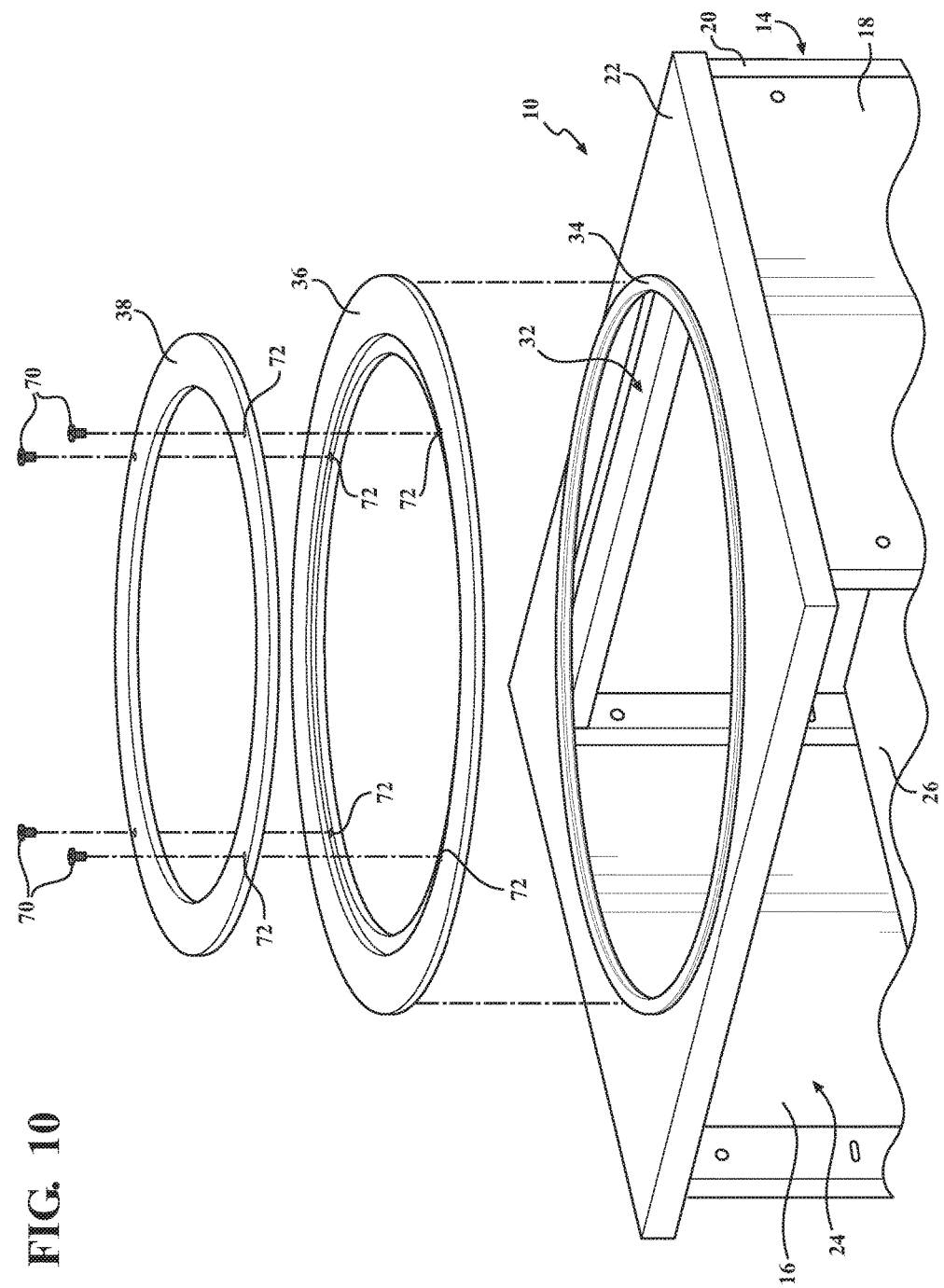
FIG. 10 is an exploded view of a portion of another embodiment of the cabinet including fasteners for attaching the first and second adjustment mechanisms.
Figure 11:
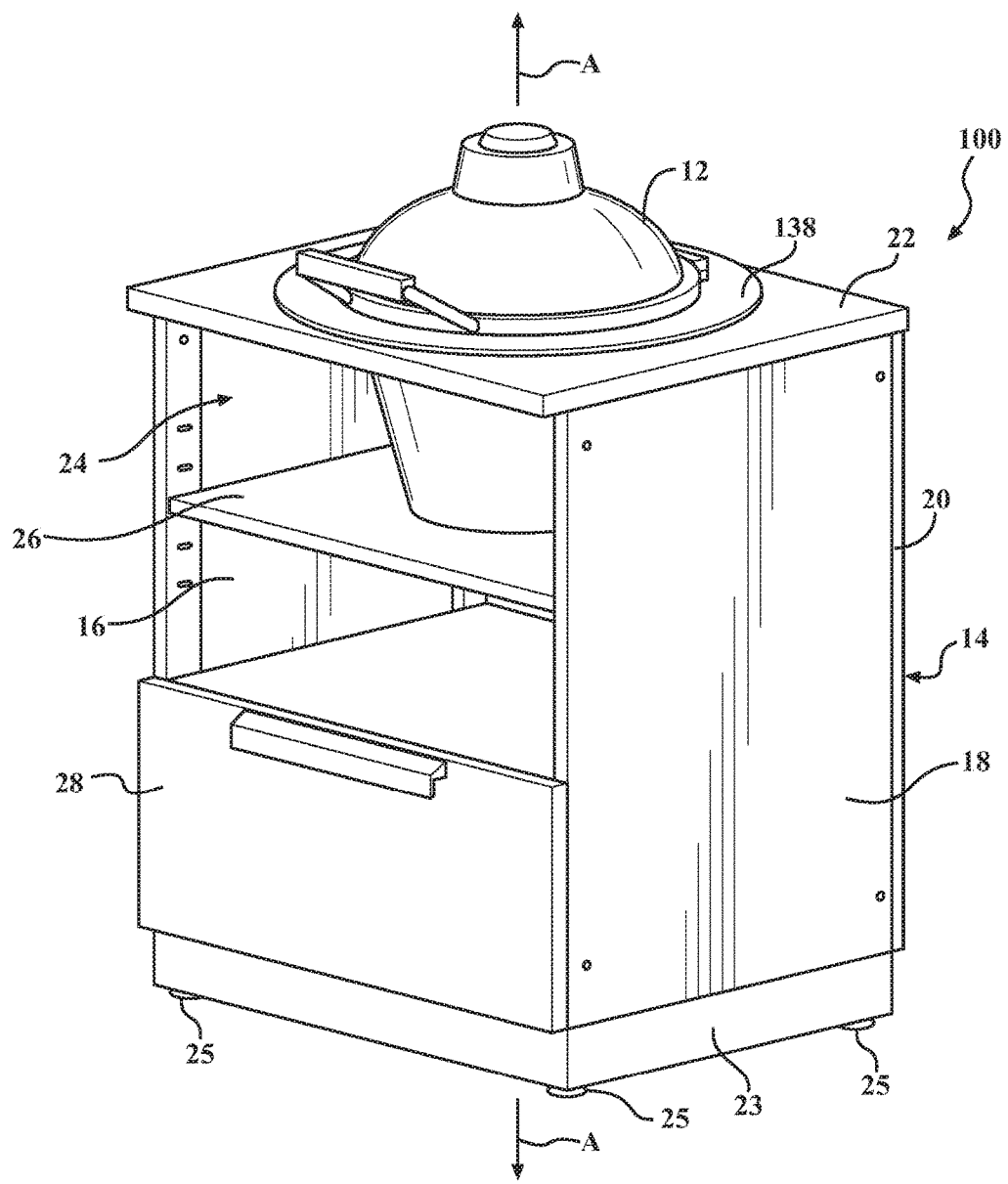
FIG. 11 is a perspective view of an assembly including a cabinet and the cooking device having the first size supported by the cabinet, according to a second embodiment of the present disclosure.

In an embodiment shown in FIG. 10, the cabinet 10 further has at least one fastener 70 disposed through the first adjustment element 36 and the second adjustment element 38 to attach the first adjustment element 36 and the second adjustment element 38 together. In the embodiment shown, the cabinet 10 has a plurality of fasteners 70 with each fastener 20 disposed through aligned apertures 72 defined in the first 36 and second 38 adjustment elements. When the cabinet 10 is used for supporting the small-sized cooking device 12, the operator can attach the first 36 and second 38 adjustment elements together, and place the adjustment elements 36, 38 as a unit over the opening 32 to adjust the configuration of the opening 32. The unit is placed over the opening 32 such that a portion of the adjustment surface 46 of the first adjustment element 36 overlaps the top surface 22.

A second embodiment of the cabinet 100 is described below with reference to FIGS. 11-18. The frame 14 (including the first side panel 16, the second side panel 18, the rear panel 20, and the top surface 22), and the orientation device 34 of the cabinet 100 for the second embodiment are the same as previously described for the first embodiment of the cabinet 10 shown in FIGS. 1-10. The second embodiment of the cabinet 100 further has at least one adjustment element 36. The adjustment element 136 is directly attached to the top surface 22 of the frame 14 to extend a distance $D_1$ toward the center axis A to form an adjusted configuration $AC_1$ of the opening 32 for receiving the medium-sized cooking device 12.

In an embodiment, the at least one adjustment element 36 is further defined as first 36 and second 38 adjustment elements. The first adjustment element 36 is directly attached to the top surface 22 of the frame 14 to extend a first distance $D_1$ toward the center axis A to form a first adjusted configuration $AC_1$ of the opening 32 for receiving the medium-sized cooking device 12. The second adjustment element 138 is attached to the top surface 22 of the frame 14 to extend a second distance $D_2$ toward the center axis to form a second adjusted configuration $AC_2$ of the opening 32 that is different than the first adjusted configuration $AC_1$ for receiving the small-sized cooking device 12.

The first adjustment element 136 of the second embodiment of the cabinet 100 could have the same configuration as the first adjustment element 36 of the first embodiment of the cabinet shown in FIGS. 1-4 and 7-9. In another embodiment, the first adjustment element 136 has a different configuration as described below with reference to FIGS. 15-18.

Figure 17:
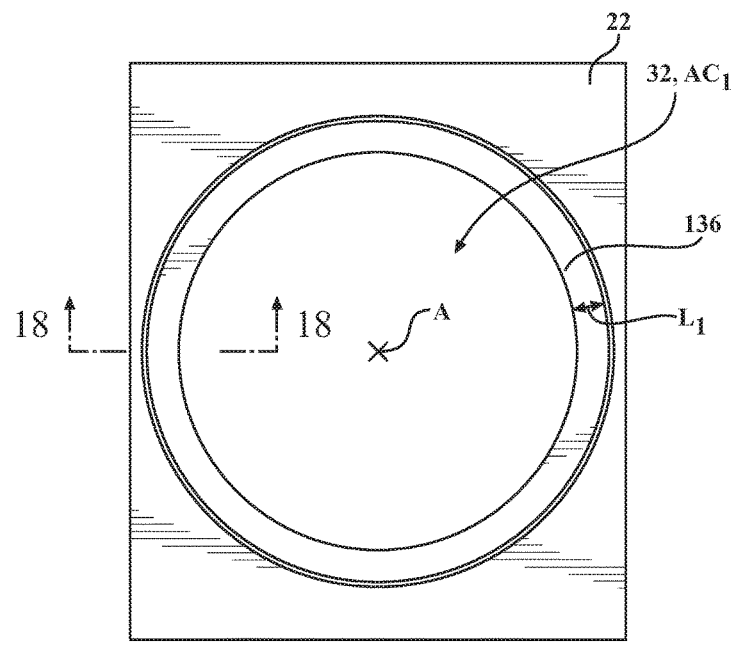
FIG. 17 is a top view of the cabinet shown in FIG. 15.
Figure 18:
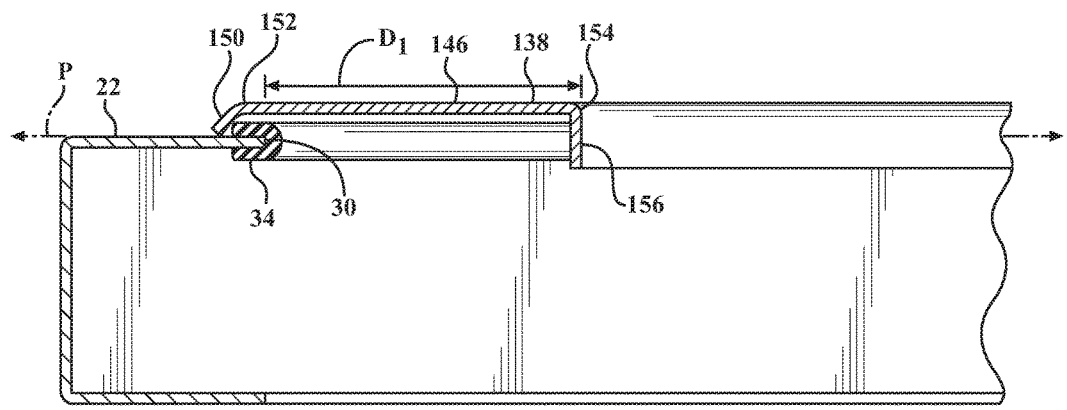
FIG. 18 is a cross-sectional view of the cabinet taken along line 18-18 in FIG. 17.

As best shown in FIGS. 17 and 18, the first adjustment element 136 has an adjustment surface 146 disposed on one side of the plane P of the top surface 22 of the frame 14 and parallel to the top surface 22 of the frame 14. The adjustment surface 146 of the first adjustment element 136 has a length $L_1$.

The first adjustment element 136 further has a lip 150 extending from the adjustment surface 146. The lip 150 engages the orientation device 34 to secure the first adjustment element 136 to the top surface 22 of the frame 14. The lip 150 may have any suitable length and, in the embodiment shown, extends from the adjustment surface 146 in a downward direction. The lip 150 may be integral with the adjustment surface 146, or may be attached to the adjustment surface 146 by any suitable means such as by welding or the like. In addition, the lip 150 extends along the entire circumference of the first adjustment element 136. In an alternative embodiment, the lip 150 could extend along a portion of the circumference of the first adjustment element 136.

The first adjustment element 136 has first 152 and second 154 ends with the first end 152 attached to the top surface 22 of the frame 14. In an embodiment, the lip 150 extends from the first end 152 of the first adjustment element 136. The adjustment element 136 further has a flange 156 extending from the second end 154. As shown, the flange 156 may be integral with or attached to the second end 154, such as by welding or the like, and the flange 156 extends inwardly toward the compartment 24 defined by the frame 14.

The second adjustment element 138 is described below with reference to FIGS. 11-14. The second adjustment element 138 has an adjustment surface 148. The adjustment surface 148 of the second adjustment element 138 has a length $L_2$. The length $L_2$ of the adjustment surface 148 of the second adjustment element 138 is larger than the length $L_1$ of the adjustment surface 146 of the first adjustment element 136. In an embodiment, the length $L_2$ of the adjustment surface 148 of the second adjustment element 138 is twice as long as the length $L_1$ of the adjustment surface 146 of the first adjustment element 136.

Figure 14:
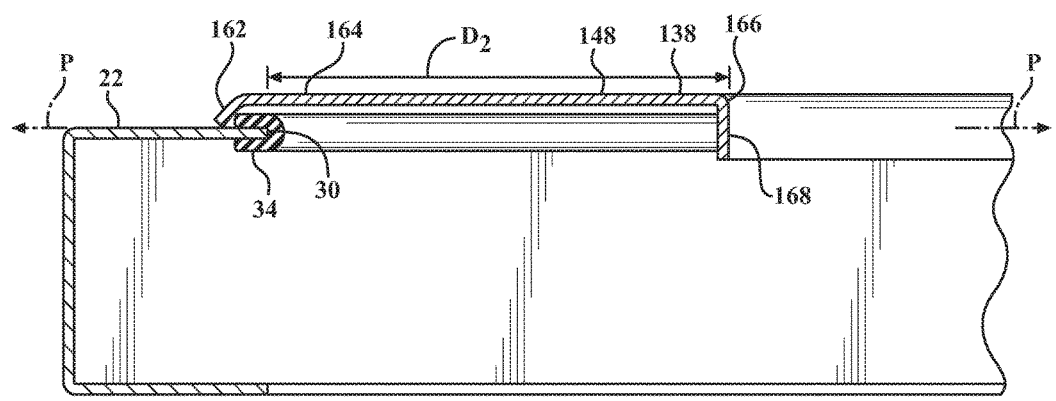
FIG. 14 is a cross-sectional view of the cabinet taken along line 14-14 in FIG. 13.
Figure 15:
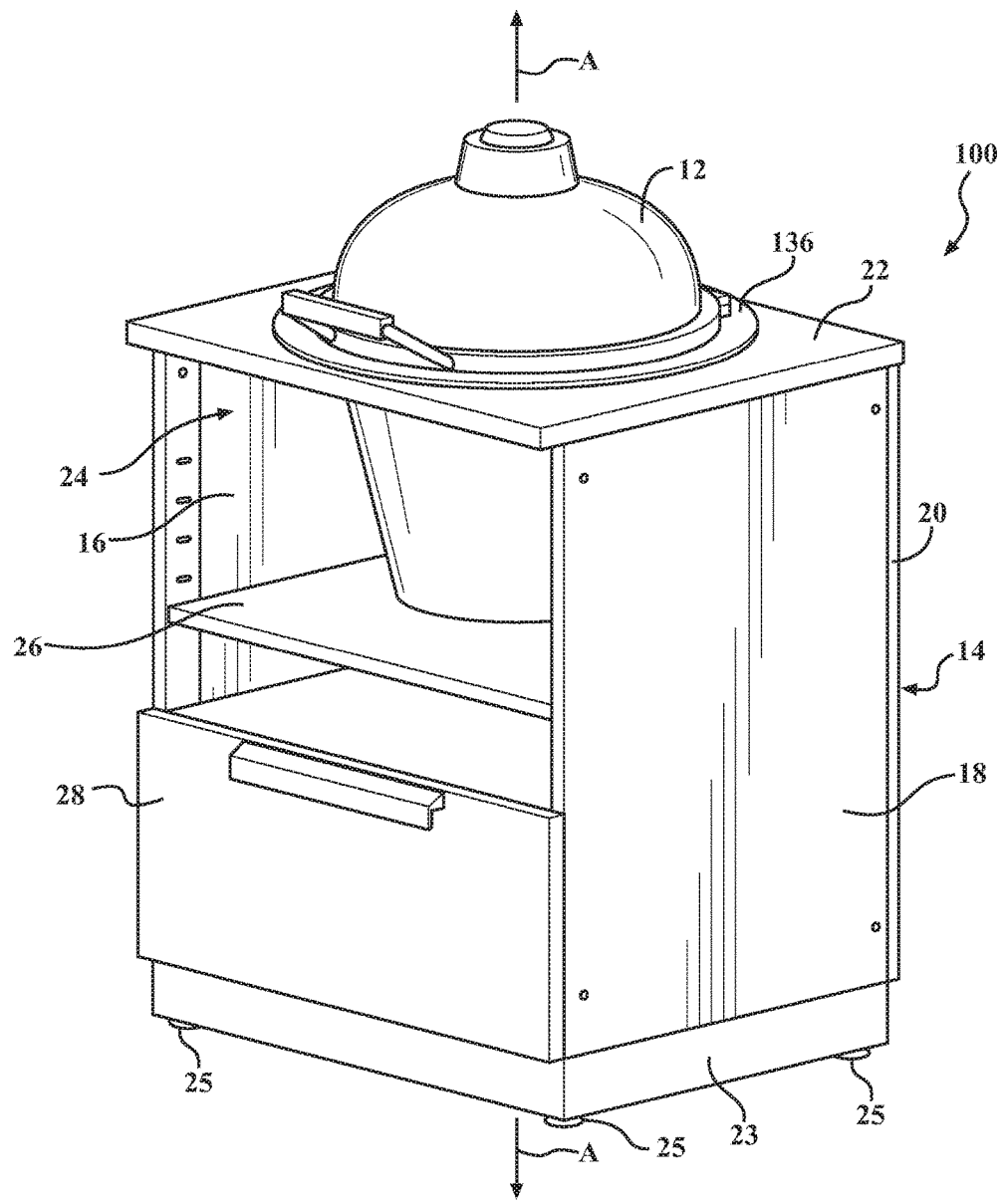
FIG. 15 is a perspective view of an assembly including the second embodiment of the cabinet and the cooking device having the medium size supported by the cabinet.

As best shown in FIG. 14, the adjustment surface 148 of the second adjustment element 138 is disposed on one side of the plane P of the frame 14, which is the same side of the plane P that the adjustment surface 146 of the first adjustment element 136 is disposed. In addition, the adjustment surface 148 of the second adjustment element 138 is parallel to the top surface 22 of the frame 14.

The second adjustment element 138 further has a lip 162 extending from the adjustment surface 148 of the second adjustment element 138. The lip 162 engages the orientation device 34 to secure the second adjustment element 138 to the top surface 22 of the frame 14. The lip 162 may have any suitable length and, in the embodiment shown, extends from the adjustment surface 148 in a downward direction. The lip 162 may be integral with the adjustment surface 148, or may be attached to the adjustment surface 148 by any suitable means such as by welding or the like. In addition, the lip 162 extends along the entire circumference of the second adjustment element 138. In an alternative embodiment, the lip 162 could extend along a portion of the circumference of the second adjustment element 138.

The second adjustment element 138 has first 164 and second 166 ends with the lip 162 of the second adjustment element 138 extending from the first end 164 of the second adjustment element 138. The second adjustment element 138 further has a flange 168 that extends from the second end 166 of the second adjustment element 138 to define the second adjusted configuration $AC_2$. As shown, the flange 168 may be integral with or attached to the second end 166, such as by welding or the like, and the flange 168 extends inwardly toward the compartment 24 defined by the frame 14.

Each of the first and second adjustment elements 136, 138 has an annular configuration. Alternatively, each of the first and second adjustment elements 136, 138 could have any suitable configuration. In addition, the first and second adjustment elements 136, 138 can have substantially the same configuration, or the first adjustment element 136 could have a configuration that differs from that of the second adjustment element 138.

Figure 16:
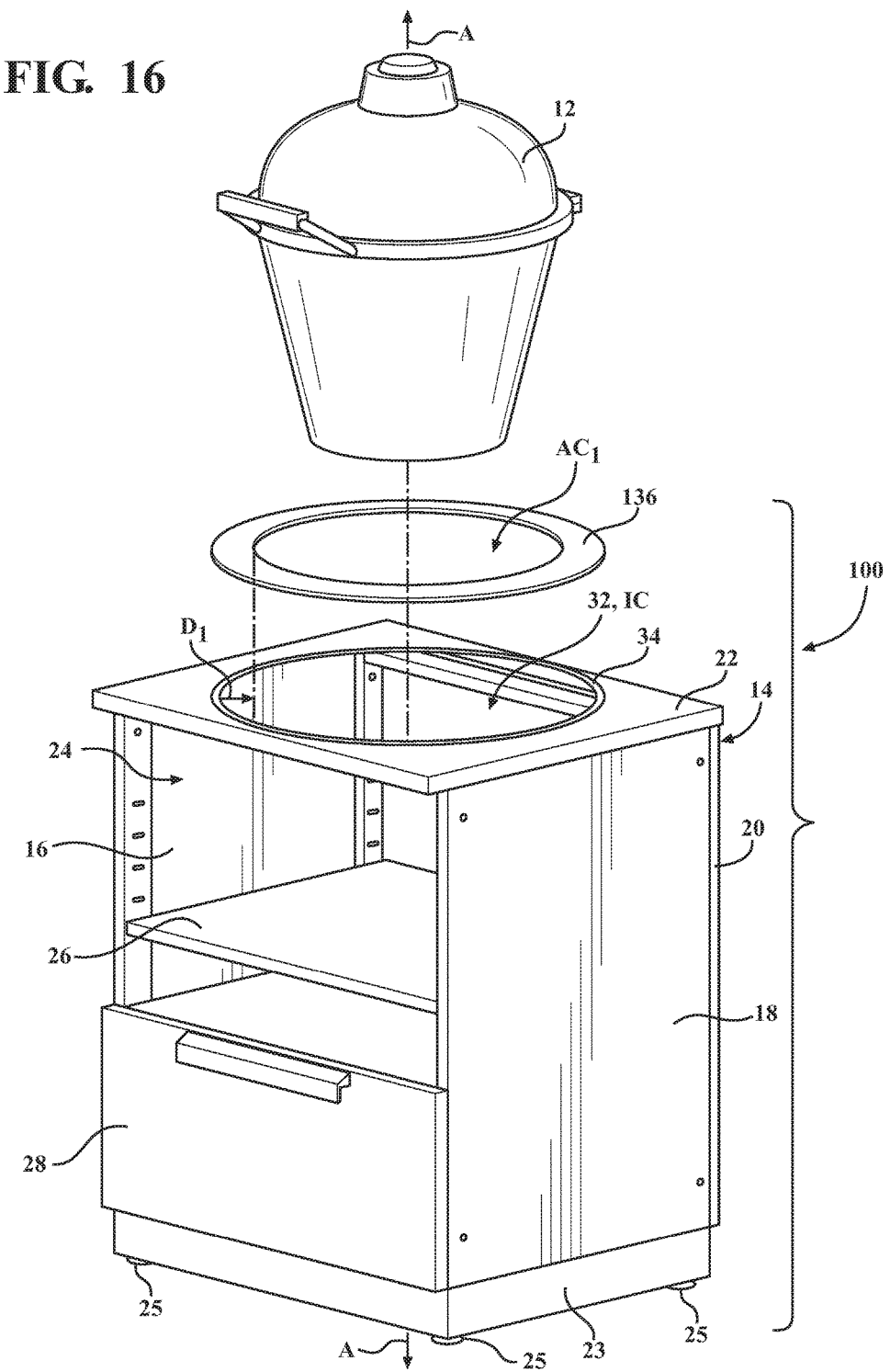
FIG. 16 is an exploded view of the assembly of FIG. 15.

The second embodiment of the cabinet 100 is configured to support the medium-sized cooking device 12 in the same fashion as previously described for the first embodiment of the cabinet 10. For example, and with reference to FIGS. 15 and 16, an operator places the first adjustment element 136 over the opening 32 such that a portion of the adjustment surface 146 overlaps the top surface 22. The first adjustment element 136 also overlaps the orientation device 34 such that the lip 150 engages the orientation device 34 to secure the first adjustment element 136 to the top surface 22 of the frame 14. When the first adjustment surface 136 is set into position, the medium-sized cooking device 12 is partially placed through the opening 32 having the first adjusted configuration $AC_1$. The first adjusted configuration $AC_1$ is smaller than the initial configuration IC of the opening 32 (as shown in FIG. 16) to properly accommodate and/or fit the cross-sectional configuration of the medium-sized cooking device 12. In addition, the bottom side of the cooking device 12 rests against the shelf 26 disposed in the compartment 24 of the frame 14. The shelf 26 may be adjusted based on the configuration of the opening 32, and relative to the height H of the frame 14 to accommodate the medium-sized cooking device 12. In some instances, the cooking device 12 has the lip 13, and the height of the shelf 26 may be adjusted to that the lip 13 rests against the adjustment surface 136 of the first adjustment element 36.

Figure 12:
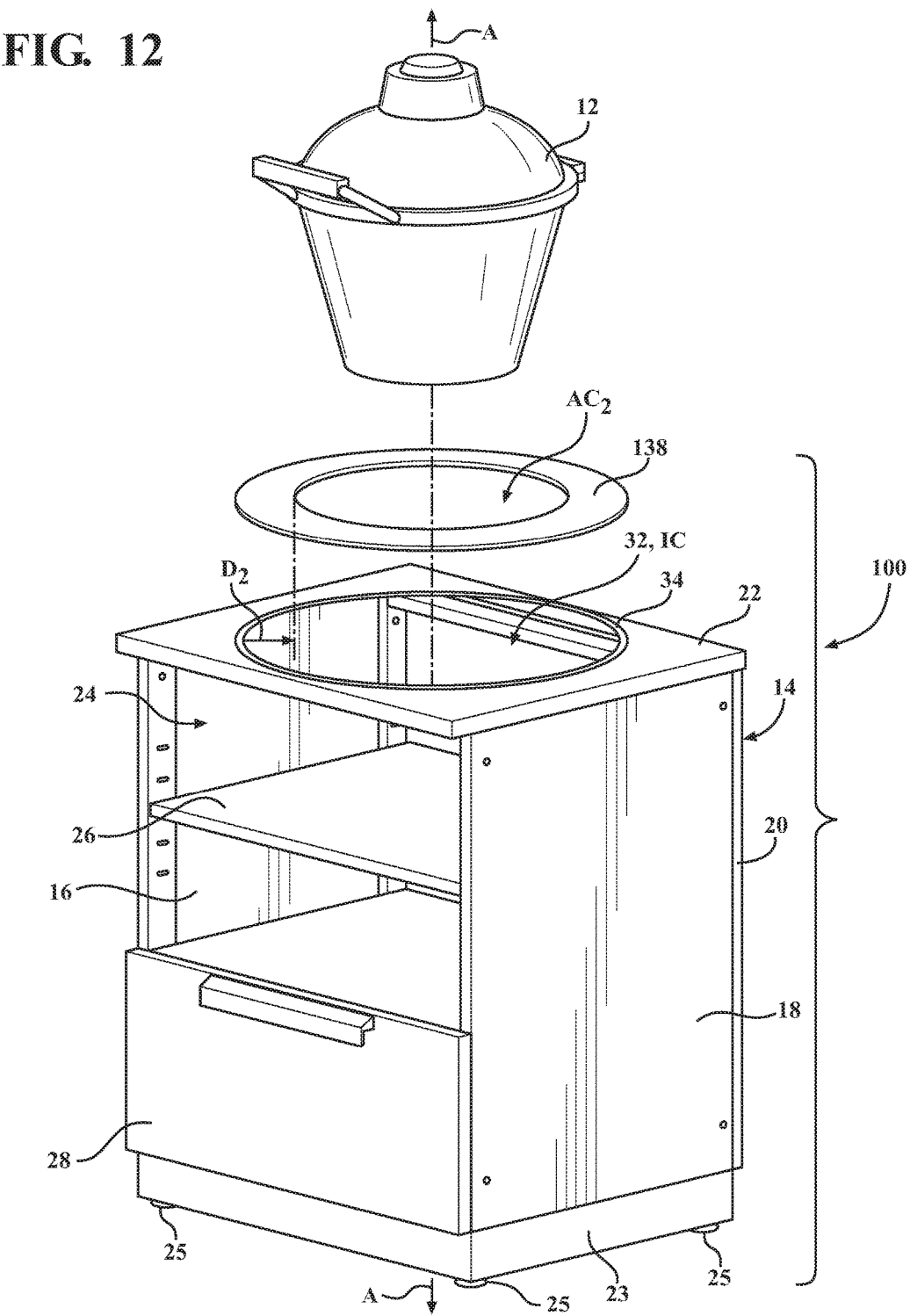
FIG. 12 is an exploded view of the assembly of FIG. 11.
Figure 13:
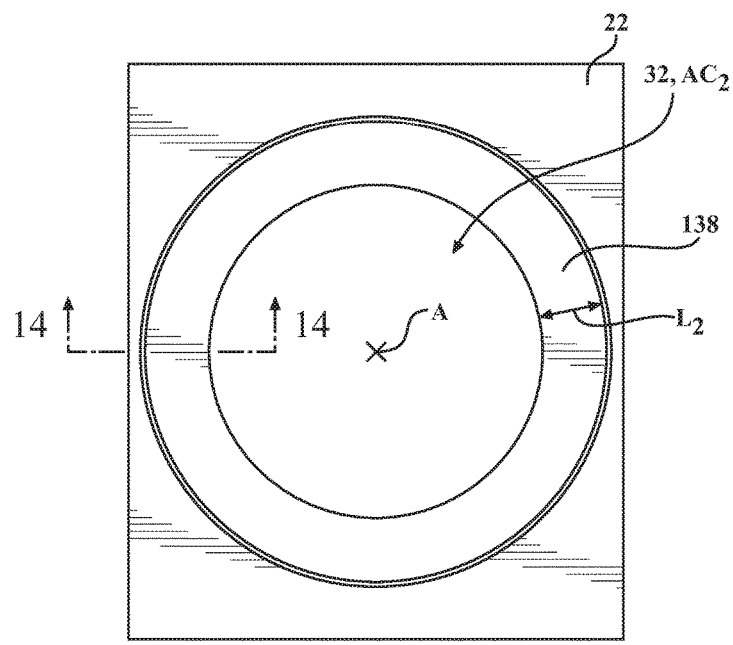
FIG. 13 is a top view of the cabinet shown in FIG. 11.

The second embodiment of the cabinet 100 is configured to support the small-sized cooking device 12 utilizing the same process for supporting the medium-sized cooking device 12 except that the second adjustment element 138 is used rather than the first adjustment element 136. In other words, the first 136 and second 138 adjustment elements are interchangeable. Accordingly, in the second embodiment of the cabinet 100, the first adjustment element 136 is not used in any way when the small-sized cooking device 12 is supported, and the second adjustment element 138 is not used in any way when the medium-sized cooking device 12 is supported. For example, and with reference to FIGS. 11 and 12, the operator removes the first adjustment element 136 from the cabinet 10 if one is present. The operator places the second adjustment element 138 over the opening 32 such that a portion of the adjustment surface 148 overlaps the top surface 22. The second adjustment element 138 also overlaps the orientation device 34 such that the lip 162 engages the orientation device 34 to secure the second adjustment element 138 to the top surface 22 of the frame 14. When the second adjustment surface 138 is set into position, the small-sized cooking device 12 is partially placed through the opening 32 having the second adjusted configuration $AC_2$. The second adjusted configuration $AC_2$ is smaller than the initial configuration IC of the opening 32 (as shown in FIG. 12) and is smaller than the first adjusted configuration $AC_1$ to properly accommodate and/or fit the cross-sectional configuration of the small-sized cooking device 12. In addition, the bottom side of the cooking device 12 rests against the shelf 26 disposed in the compartment 24 of the frame 14. The shelf 26 may be adjusted based on the configuration of the opening 32, and relative to the height H of the frame 14 to accommodate the small-sized cooking device 12. In some instances, the cooking device 12 has the lip 13, and the height of the shelf 26 may be adjusted to that the lip 13 rests against the adjustment surface 148 of the second adjustment element 138.

Figure 19:
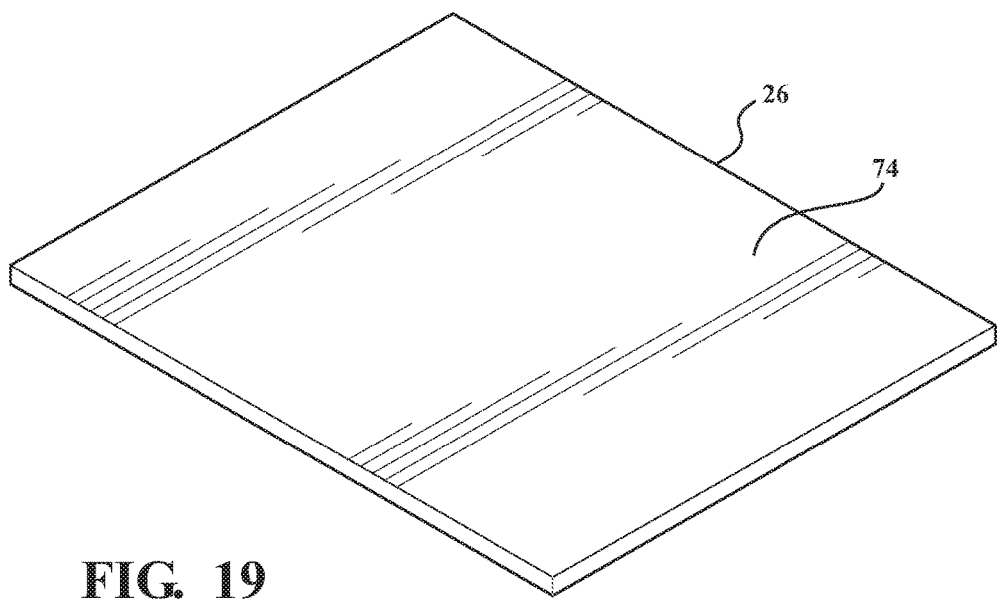
FIG. 19 is a top perspective view of a shelf for the cabinet.
Figure 20:
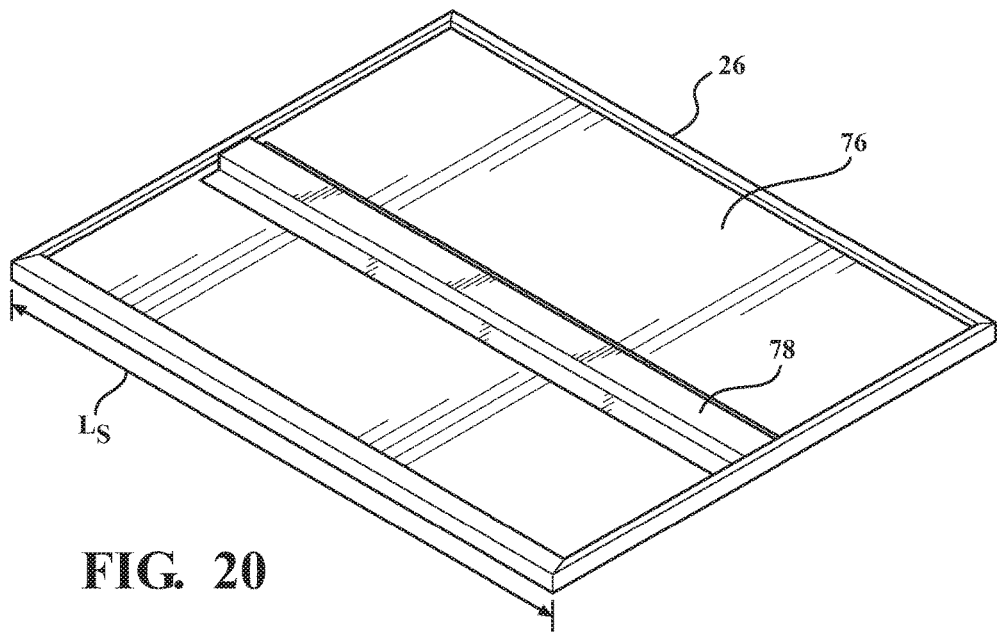
FIG. 20 is a bottom perspective view of the shelf of FIG. 19.
Figure 23:
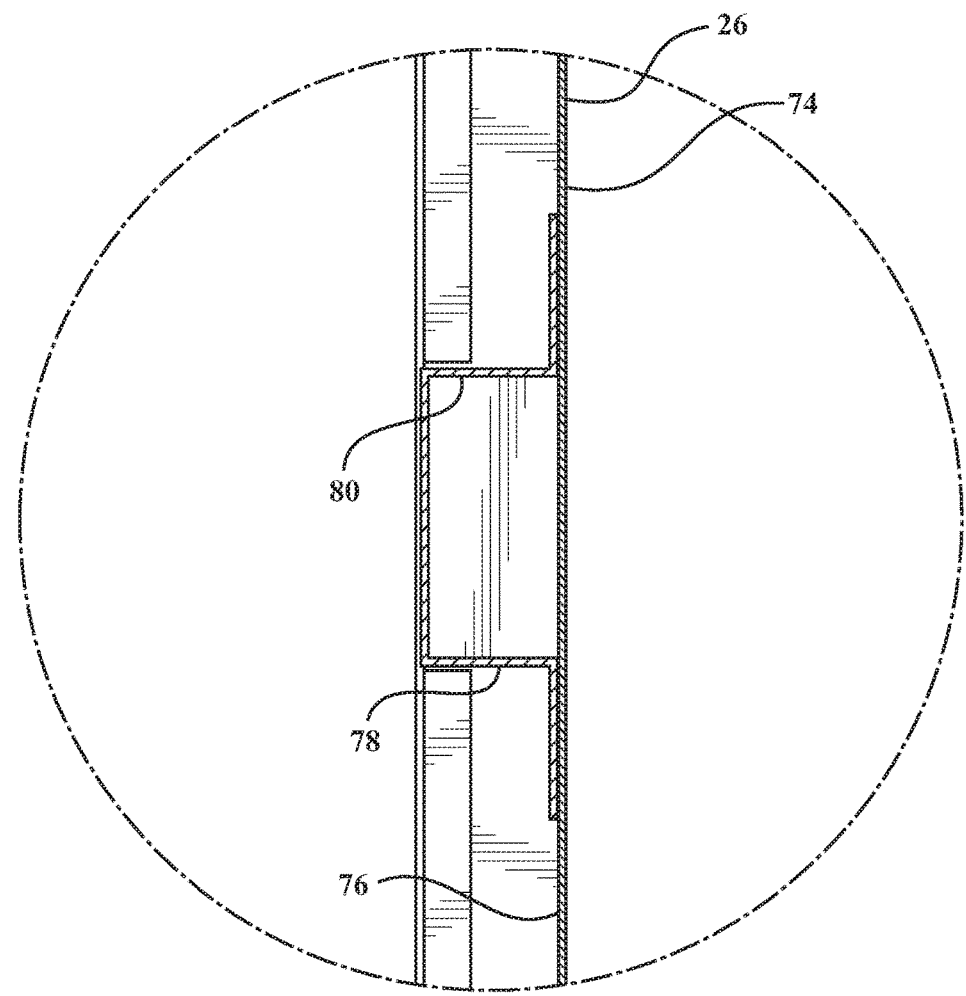
FIG. 23 is an enlarged view of a portion of the shelf shown in FIG. 22.

Details of the shelf 26 and the adjustability of the shelf 26 based on the configuration of the opening 32 defined by the edge 30 of the top surface 22 of the cabinet 10, 100 are described below with reference to FIGS. 19-23. A top perspective view of the shelf 26 is shown in FIG. 19, and a bottom perspective view of the shelf 26 is shown in FIG. 20. The shelf 26 may be formed from any suitable material, which may be the same or different from the material of the panels 16, 18, 20 of the frame 14. The shelf 26 has top 74 and bottom 76 surfaces and a bracket 78 extending at least partially along a length Ls of the shelf 26. The bracket 78 defines a slot 80 extending along the length of the bracket 78.

Figure 24:
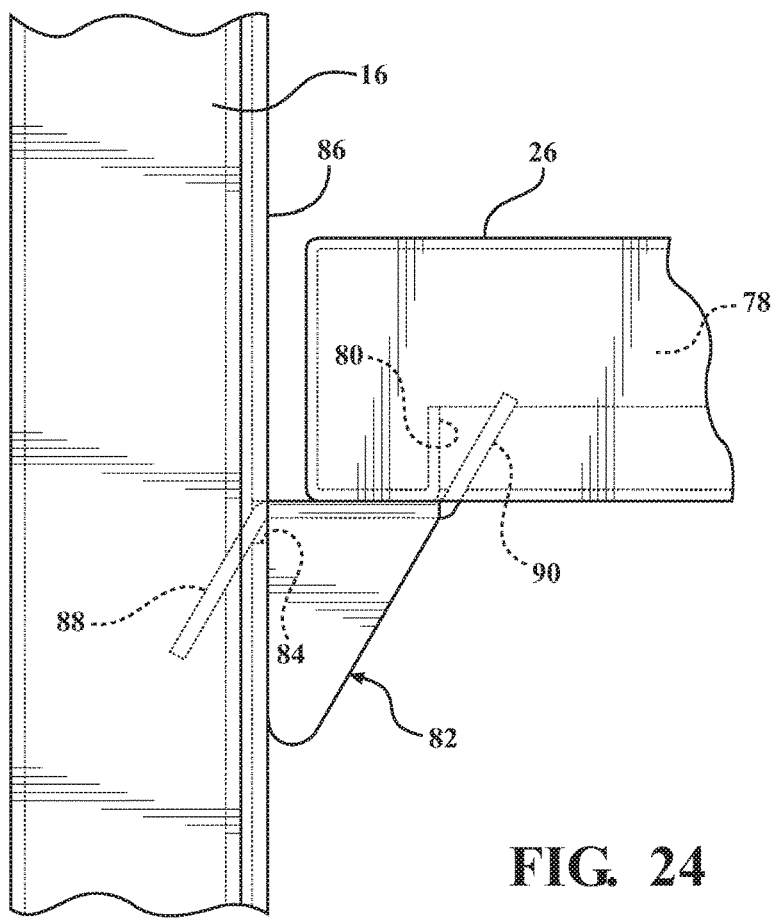
FIG. 24 is a side view of a portion of the cabinet including a frame and the shelf removable coupled to a frame utilizing a fastening mechanism.
Figure 25:
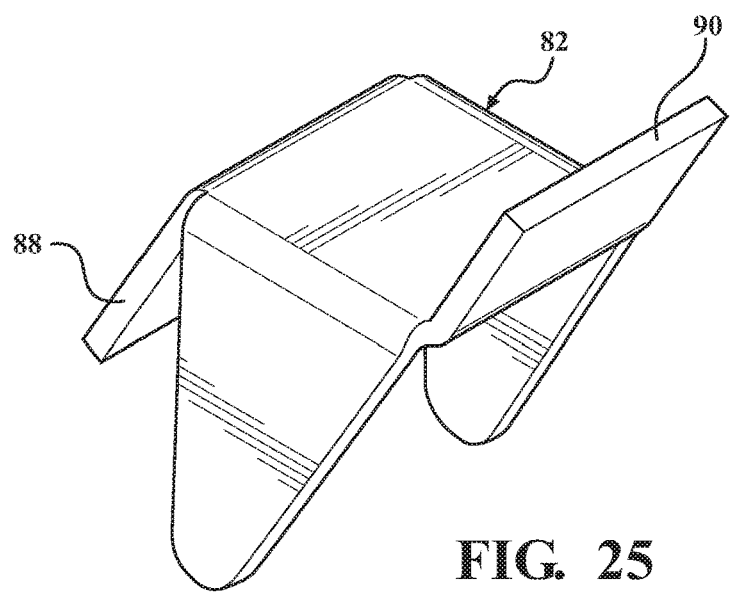
FIG. 25 is a perspective view of the fastening mechanism shown in FIG. 24.

The shelf 26 is removable attached to the first 16 and second 18 side panels of the frame 14 of the cabinet 10. With reference to FIGS. 24 and 25, the shelf 26 is adjustably attached to the frame 14 utilizing a clip 82. For example, the side panel 16 defines a plurality of slots 84. In an embodiment, and as shown in FIG. 1 for example, the side panel 16 has a strip of material 86 defining the plurality of slots 84. The strip of material 86 may be mounted to the side panel 16 by any suitable fashion. It is to be appreciated that the second side panel 18 also defines a plurality of slots, or has a strip of material defining the plurality of slots. Each slot 84 of the first panel 16 aligns with a respective slot of the second panel 18 to define an adjustment level for the shelf 26. Accordingly, each pair of slots (aligned slots of the panels 16, 18) defines an adjustment level for the shelf 26 relative to the height H of the frame 14.

As shown in FIGS. 24 and 25 (and at least FIG. 1), the clip 82 has first 88 and second 90 arms, with the first arm 88 extending in one direction and the second arm 90 extending in an opposite direction. As best shown in FIG. 24, the first arm 88 extends into one of the slots 84 defined by the panel 16 and/or the strip 86 mounted to the panel 16 to secure the clip 82 to the panel 16. The second arm 90 extends into the slot 80 defined by the bracket 78 attached to the bottom surface 76 of the shelf 26 to secure the clip to the shelf 26. It is to be appreciated that a similar clip is used at the other end of the shelf 26 to secure the shelf 26 to the panel 18.

The shelf 26 may be adjusted relative to the height H of the frame 14 by attaching the clip 82 to the panel 16 by sliding or inserting the first arm 88 into one of the slots 84 defined in the panel 16 or defined in the strip 86 mounted to the panel 16. Another clip is attached to the panel 18 by sliding or inserting the first arm of the other clip into the a slot defined in the panel 18 or defined in a strip mounted to the panel 18 that is aligned with the slot 84 that the clip 82 is mounted to. The shelf 26 is placed on the clips 82 and secured to the panels 16, 18 by inserting the second arm 90 of the clips 82 into the slot 80 defined in the bracket 78 attached to the bottom surface 76 of the shelf 26. As different-sized cooking devices 12 are used, the height of the shelf 26 may be adjusted by removing the shelf 26, moving the clips 82 to another pair of aligned slots 84, and replacing shelf 26. Typically, the shelf 26 is adjusted in a downwards direction as the configuration of the opening 32 gets larger (to accommodate and/or fit a larger-sized cooking device 12), and is adjusted in an upwards direction as the configuration of the opening gets smaller (to accommodate and/or fit a smaller-sized cooking device 12).

Figure 26:
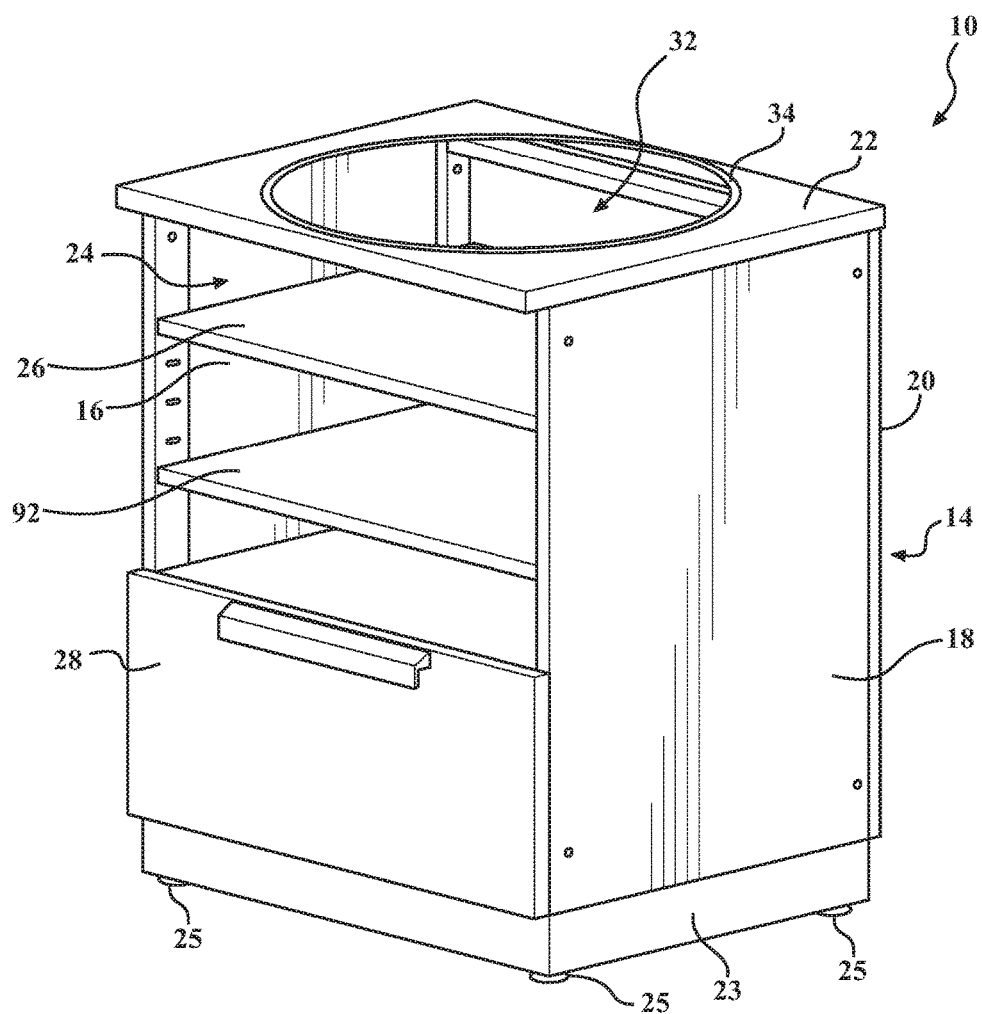
FIG. 26 is a perspective view showing an embodiment of the cabinet including multiple shelves.

In an embodiment, and as shown in FIG. 26, the cabinet 10, 100 may include at least one additional shelf 92. The additional shelf(s) 92 is positioned below the adjustable shelf 26, and may provide additional storage within the compartment 24 of the cabinet 10. The additional shelf 92 may be fixed to the side panels 16, 18, or may be adjustable relative to the height H of the frame 14 of the cabinet 10, 100.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A cabinet for supporting one of a plurality of cooking devices having varying sizes, with said cabinet comprising:
   a frame defining a center axis with said frame having a top surface having an edge defining an opening with said opening having an initial configuration to provide access through said frame for receiving one of the plurality of cooking devices;
   at least one adjustment element directly attached to said top surface of said frame and extending a distance toward said center axis to form an adjusted configuration of said opening with said opening having said adjusted configuration providing access through said frame for receiving another one of the plurality of cooking devices.

2. The cabinet as set forth in claim 1 wherein said at least one adjustment element partially overlaps said top surface of said frame.

3. The cabinet as set forth in claim 1 wherein said at least one adjustment element has an adjustment surface with a portion of said adjustment surface overlapping said top surface of said frame.

4. The cabinet as set forth in claim 3 wherein said adjustment surface is parallel to said top surface of said frame.

5. The cabinet as set forth in claim 1 further comprising an orientation device attached to and extending at least partially along said edge of said top surface with a portion of said at least one adjustment element overlapping said orientation device for maintaining a particular position of said at least one adjustment element relative to said edge.

6. The cabinet as set forth in claim 5 wherein said at least one adjustment element has an adjustment surface and a lip extending from said adjustment surface with said lip engaging said orientation device to secure said at least one adjustment element to said top surface of said frame.

7. The cabinet as set forth in claim 1 wherein said at least one adjustment element is further defined as first and second adjustment elements, said distance is further defined as first and second distances, and said adjusted configuration of said opening is further defined as first and second adjusted configurations of said opening, with said first adjustment element directly attached to said top surface of said frame and extending said first distance toward said center axis to form said first adjusted configuration of said opening for receiving the one of the plurality of cooking devices, and said second adjustment element attached to one of said first adjustment element and said top surface of said frame and extending said second distance toward said center axis to form said second adjusted configuration of said opening that is different than said first adjusted configuration for receiving the other one of the plurality of cooking devices.

8. The cabinet as set forth in claim 7 wherein at least one of said first and second adjustment elements has first and second ends with said first end attached to said top surface of said frame and said at least one of said first and second adjustment elements having a flange extending from said second end to define one of said adjusted configurations.

9. The cabinet as set forth in claim 7 wherein said first adjustment element has an adjustment surface and a stepped surface parallel to and offset from said adjustment surface with a portion of said second adjustment element engaging said stepped surface of said first adjustment element.

10. The cabinet as set forth in claim 9 wherein said second adjustment element has first and second ends with said lip of said second adjustment element extending from said first end of said second adjustment element, and said second adjustment element further has a flange extending from said second end of said second adjustment element to define said second adjusted configuration.

11. The cabinet as set forth in claim 9 further comprising at least one fastener disposed through said first adjustment element and said second adjustment element to attach said first adjustment element and said second adjustment element together.

12. The cabinet as set forth in claim 9 wherein said second adjustment element has an adjustment surface, and said adjustment surface of said first adjustment element is parallel to said adjustment surface of said second adjustment element.

13. The cabinet as set forth in claim 12 wherein said top surface defines a plane and each of said adjustment surface of said first adjustment element and said adjustment surface of said second adjustment element is disposed on one side of said plane.

14. The cabinet as set forth in claim 12 wherein an intersection of said adjustment surface and said stepped surface of said first adjustment element defines a stop, and said second adjustment element has an adjustment surface and a lip extending from said adjustment surface of said second adjustment element with said lip of said second adjustment element engaging said stop to secure said second adjustment element to said first adjustment element.

15. The cabinet as set forth in claim 12 wherein said adjustment surface of said first adjustment element has substantially the same length as said adjustment surface of said second adjustment element.

16. The cabinet as set forth in claim 1 wherein said at least one adjustment element has an annular configuration.

17. The cabinet as set forth in claim 1 wherein said frame has a height and defines a compartment and further comprising a shelf disposed in said compartment of said frame for supporting one of the plurality of cooking devices, with a position of said shelf being adjustable relative to said height of said frame based on said configuration of said opening.

18. The cabinet as set forth in claim 17 further comprising a clip with said shelf being adjustably attached to said frame utilizing said clip.

19. The cabinet as set forth in claim 1 wherein said frame further defines a compartment with said opening having said initial configuration to provide access to said compartment and said opening having said adjusted configuration to provide access to said compartment.

20. The cabinet as set forth in claim 1 wherein said edge of said frame is spaced a first length from said center axis to define said opening having said initial configuration and said at least one adjustment element is spaced a second length from said center axis with said second length smaller than said first length to define said opening having said adjusted configuration.

* * * * *